United States Patent
Yasunaga et al.

(10) Patent No.: US 7,320,759 B2
(45) Date of Patent: Jan. 22, 2008

(54) SLUDGE TREATMENT METHOD

(75) Inventors: Nozomu Yasunaga, Tokyo (JP); Toshiyuki Kamiya, Tokyo (JP); Naoki Nakatsugawa, Tokyo (JP); Junji Hirotsuji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/559,006

(22) Filed: Nov. 13, 2006

(65) Prior Publication Data

US 2007/0068876 A1 Mar. 29, 2007

Related U.S. Application Data

(62) Division of application No. 10/961,113, filed on Oct. 12, 2004.

(30) Foreign Application Priority Data

Jan. 7, 2004 (JP) ............... 2004-002136
May 28, 2004 (JP) ............... 2004-160048

(51) Int. Cl.
*C02F 11/06* (2006.01)
*C02F 101/10* (2006.01)

(52) U.S. Cl. ............ 210/712; 210/609; 210/718; 210/721; 210/760; 210/906

(58) Field of Classification Search ........... 210/721
See application file for complete search history.

(56) References Cited

U.S. PATENT DOCUMENTS

| | | | |
|---|---|---|---|
| 4,689,154 A * | 8/1987 | Zimberg | 210/667 |
| 5,275,639 A | 1/1994 | Sullivan et al. | |
| 5,914,040 A * | 6/1999 | Pescher et al. | 210/638 |
| 6,077,431 A * | 6/2000 | Kawanishi et al. | 210/609 |
| 6,106,717 A * | 8/2000 | Hasegawa et al. | 210/607 |
| 6,146,521 A * | 11/2000 | Yasui | 210/137 |
| 6,303,034 B1 | 10/2001 | Kamiya et al. | |
| 6,451,276 B1 | 9/2002 | Saran et al. | |

(Continued)

FOREIGN PATENT DOCUMENTS

EP 0 903 325 A1 3/1999

(Continued)

OTHER PUBLICATIONS

Nozomu Yasunaga, et al., "Recovering Phosphates from Sewage Sludge", Mitsubishi Electric Advance, Dec. 2003, pp. 17-20.

*Primary Examiner*—Peter A. Hruskoci
(74) *Attorney, Agent, or Firm*—Oblon, Spivak, McClelland, Maier & Neustadt, P.C.

(57) ABSTRACT

A sludge treatment method allowing an improvement in a phosphorus recovery rate and sludge volume reduction by efficiently eluting phosphorus in the sludge. The sludge treatment method includes: a step of foaming a sludge-containing liquid by blowing an ozone-containing gas into the sludge-containing liquid; and a step of eluting phosphorus in the sludge-containing liquid by bringing sludge adsorbed on bubbles and a sludge-dissolving agent into contact with each other. The sludge treatment method may further include the steps of: separating the phosphorus eluted sludge-containing liquid into a phosphorus eluate and a residual sludge; and precipitating a phosphorus compound by adding a coagulant to the separated phosphorus eluate.

14 Claims, 17 Drawing Sheets

U.S. PATENT DOCUMENTS

| | | | |
|---|---|---|---|
| 6,706,185 B2 * | 3/2004 | Goel et al. | 210/605 |
| 6,800,196 B2 * | 10/2004 | Matsuo et al. | 210/149 |
| 7,070,747 B2 * | 7/2006 | Yasunaga et al. | 423/299 |

FOREIGN PATENT DOCUMENTS

| | | |
|---|---|---|
| JP | 8-267099 | 10/1996 |
| JP | 10-15597 | 1/1998 |
| JP | 10-156381 | 6/1998 |
| JP | 2002-263676 | 9/2002 |
| JP | 2003-200193 | 7/2003 |

* cited by examiner

SLUDGE TREATMENT METHOD

CROSS REFERENCE TO RELATED APPLICATIONS AND INCORPORATED BY REFERENCE

This application is a divisional of and claims the benefit of priority under 35 USC §120 from U.S. Ser. No. 10/961,113, filed Oct. 12, 2004 and is based upon and claims the benefit of priority under 35 USC §119 from the Japanese Patent Applications No. 2004-402136 filed Jan. 7, 2004, and 2004-160048, filed May 28, 2004, the entire contents of which are incorporated by reference herein.

FIELD OF THE INVENTION

The present invention relates to a sludge treatment method and a sludge treatment apparatus for treating sludge generated during treatment of sewage, food wastewater, livestock wastewater, or the like.

BACKGROUND OF THE INVENTION

It is estimated that phosphate rock, which is a raw material for phosphorus, will be depleted in less than 100 years. Japan imports 100% of its phosphate rock, and phosphorus is indispensable in agricultural production. Thus, food shortages may become a serious problem if nothing is done. Against such a background, attempts have been made to recycle organic waste by recovering and recycling phosphorus from activated sludge used in sewage treatment, food wastewater treatment, livestock wastewater treatment, or the like. In particular, the phosphorus content in sludge has increased recently through advances in sewage treatment, and thus, reduction of environmental load by recovering phosphorus from sewage sludge has become important.

An example of a known sludge treatment method including phosphorus recovery involves: solubilizing sludge using ozone or ultrasonic waves; separating solids from liquids; and adding Ca or Mg ions to the separated liquid to precipitate the barely soluble phosphate, to thereby recover phosphorus (see JP 2003-047988 A, for example). Further, an example of a known sludge treatment method employing foaming involves: blowing an ozone-containing gas through sludge to form a gas-liquid contact region; and subjecting the sludge to ozone treatment while maintaining the gas-liquid contact region at a constant height (see JP 08-267099 A, for example). However, both the methods have problems in that phosphorus in the sludge can not be sufficiently eluted and the phosphorus recovery rate is low.

Thus, a method of eluting phosphorus in sludge more efficiently than conventional methods has been proposed, which involves: subjecting the sludge to ozone treatment; and then treating the sludge with an alkali such as sodium hydroxide (see JP 2003-200193 A, for example).

However, in conventional methods involving alkali treatment after ozone treatment, ozone is not efficiently used for reaction with the sludge even if a large volume of ozone-containing gas is blown because the ozone is wasted through a reaction with dissolved components. Thus, conventional methods have problems in that the phosphorus recovery rate is about 70%, which is far from being sufficient, and in that treatment cannot be carried out efficiently. Further, the methods have problems in that the residence time of the sludge had to be long for sufficient reaction to occur between the sludge and the ozone to reduce sludge volume because of the small gas-liquid contact area.

SUMMARY OF THE INVENTION

The present invention has been made in view of solving the above problems, and an object of the present invention is therefore to provide a sludge treatment method and a sludge treatment apparatus that allow improvements in phosphorus recovery rates and sludge volume reduction by efficiently eluting phosphorus in the sludge.

The inventors of the present invention, through intensive studies on sludge treatment methods using ozone, have found that ozone and sludge can react directly with each other and that ozone can be effectively used, by adsorbing the sludge on bubbles. Further, the inventors of the present invention have found that phosphorus can be remarkably eluted by bringing the sludge adsorbed on bubbles and a sludge-dissolving agent in contact with each other, to complete the invention.

That is, the present invention relates to a sludge treatment method including the steps of: foaming a sludge-containing liquid by blowing an ozone-containing gas into the sludge-containing liquid; and eluting phosphorus in the sludge-containing liquid by bringing sludge adsorbed on bubbles and a sludge-dissolving agent into contact with each other.

Further, the present invention provides a sludge treatment apparatus including: an ozone treatment vessel which receives a supplied sludge-containing liquid and foams the sludge-containing liquid by blowing an ozone-containing gas into the sludge-containing liquid; and a phosphorus elution vessel which receives bubbles generated in the ozone treatment vessel and elutes phosphorus in the sludge-containing liquid by bringing sludge adsorbed on the bubbles and a sludge-dissolving agent into contact with each other.

According to the present invention, an improved phosphorus recovery rate and sludge volume reduction can be achieved by: foaming a sludge-containing liquid by blowing an ozone-containing gas into the sludge-containing liquid; and efficiently eluting phosphorus in the sludge by bringing the sludge adsorbed on bubbles and a sludge-dissolving agent into contact with each other.

DESCRIPTION OF THE PREFERRED EMBODIMENTS

Hereinafter, embodiments of the present invention will be described with reference to the drawings.

Embodiment 1

Figure 1:
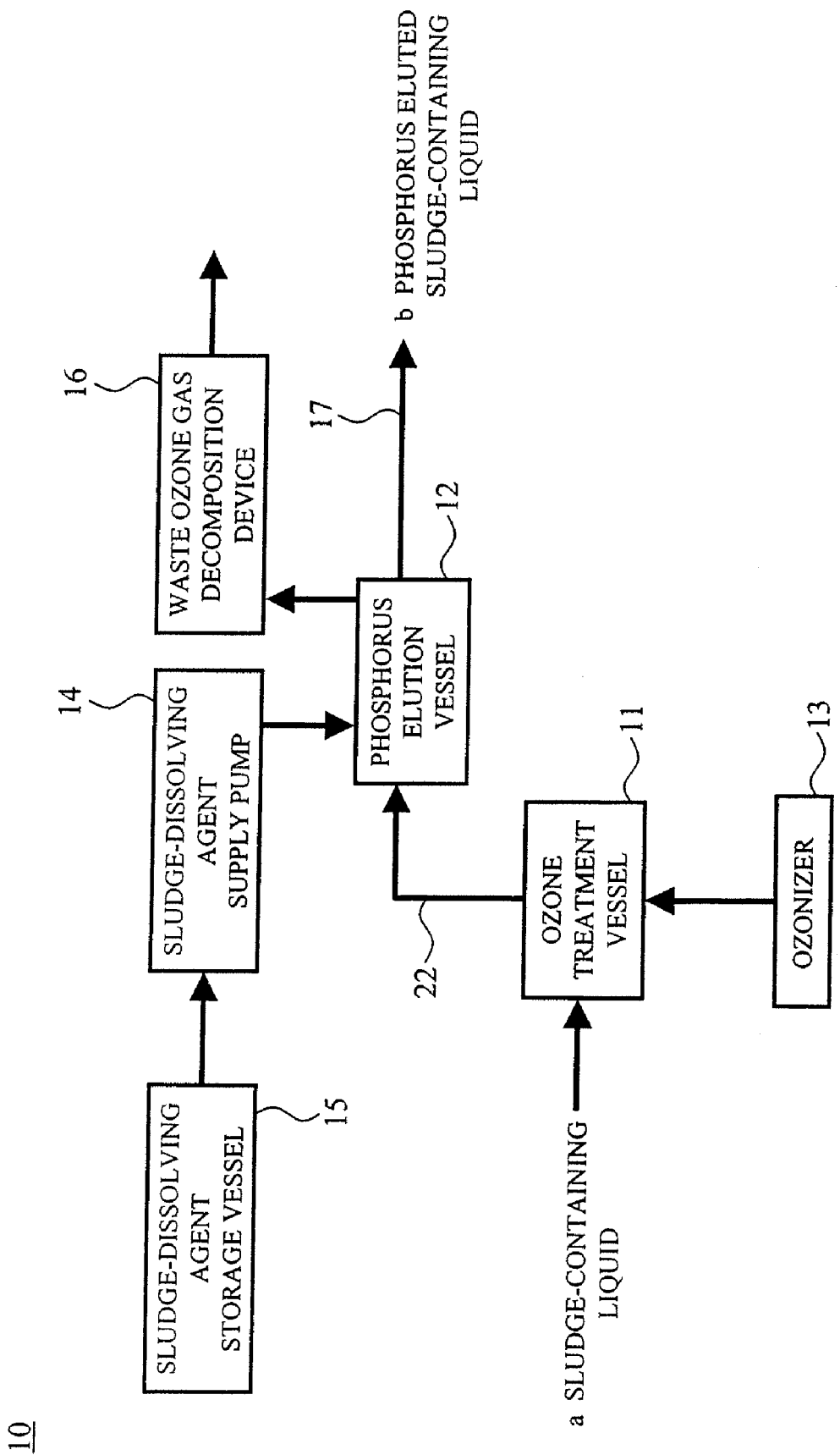
FIG. 1 is a block diagram showing a construction of a sludge treatment apparatus according to Embodiment 1 of the present invention.

FIG. 1 is a block diagram showing a construction of a sludge treatment apparatus according to Embodiment 1 of the present invention.

In FIG. 1, a sludge treatment apparatus 10 is provided with an ozone treatment vessel 11 and a phosphorus elution vessel 12, and the phosphorus elution vessel 12 is connected downstream of the ozone treatment vessel 11. An ozonizer 13, which generates an ozone-containing gas d, is connected to the ozone treatment vessel 11. A sludge-dissolving agent storage vessel 15, which temporarily stores a sludge-dissolving agent e, is connected to the phosphorus elution vessel 12 through a sludge-dissolving agent supply pump 14. A waste ozone gas decomposition device 16, which decomposes ozone gas not dissolved in a sludge-containing liquid a into oxygen and discharges oxygen ozone into the atmosphere, is connected to an upper portion of the phosphorus elution vessel 12. A discharge pipe 17, which discharges a phosphorus eluted sludge-containing liquid b, is connected to a lower portion or middle portion of the phosphorus elution vessel 12.

Sludge treatment using such a sludge treatment apparatus 10 first involves: supplying the sludge-containing liquid a generated from a sewage treatment plant (not shown) or the like to the ozone treatment vessel 11; and blowing the ozone-containing gas d generated from the ozonizer 13 into the sludge-containing liquid a in the ozone treatment vessel 11. Oxidative decomposition of the sludge proceeds by virtue of the oxidative power of ozone, thereby foaming the sludge-containing liquid a. Bubbles are readily generated in the ozone treatment vessel 11, to thereby adsorb the sludge on the bubbles. However, the amount of phosphorus eluting from the sludge into a liquid phase is small at this point, and the phosphorus elution rate is about several % at most. Sludge adsorbed bubbles c and a residual liquid h containing sludge that remains without being adsorbed on the bubbles are supplied to the phosphorus elution vessel 12 through a bubble discharge port 22. At the same time, the sludge-dissolving agent e including an alkaline aqueous solution such as an aqueous solution of sodium hydroxide or an aqueous solution of potassium hydroxide, and an acidic aqueous solution such as hydrochloric acid or sulfuric acid is supplied from the sludge-dissolving agent storage vessel 15 to the phosphorus elution vessel 12 through the sludge-dissolving agent supply pump 14. At this time in the phosphorus elution vessel 12, the sludge adsorbed bubbles c are eliminated, while the sludge which is in an easily phosphorus-eluted state through ozone treatment and the sludge-dissolving agent e are brought into contact with each other for a reaction, thereby eluting a large amount of phosphorus in the sludge into a liquid phase. The phosphorus eluted sludge-containing liquid b is discharged to the outside of the vessel through the discharge pipe 17. Of the ozone-containing gas d supplied to the ozone treatment vessel 11, ozone which could not dissolve in the sludge-containing liquid a is decomposed into oxygen and discharged to the atmosphere by the waste ozone gas decomposition device 16 connected to the upper portion of the phosphorus elution vessel 12.

Figure 2:
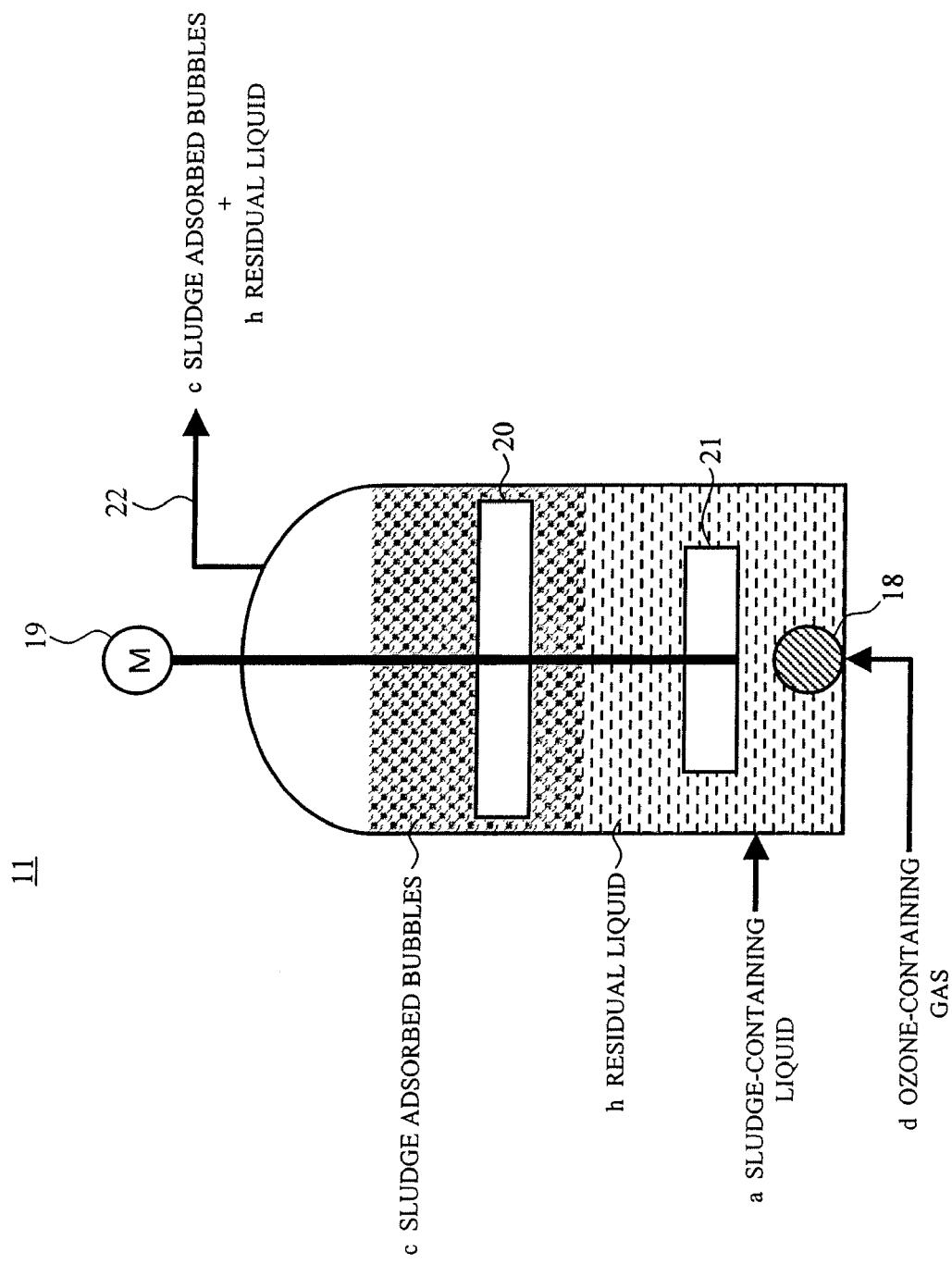
FIG. 2 is a diagram illustrating an ozone treatment vessel of the sludge treatment apparatus according to Embodiment 1 of the present invention.

Next, a step of foaming the sludge-containing liquid a by blowing the ozone-containing gas d into the sludge-containing liquid a in the ozone treatment vessel 11 will be described specifically with reference to FIG. 2.

The ozone treatment vessel 11 is provided with a diffuser pipe 18, a mixer 19, a bubble mixing blade 20, and a liquid mixing blade 21. A bubble discharge port 22 is provided in an upper portion of the ozone treatment vessel 11. The shape of the ozone treatment vessel 11 is not particularly limited as long as the vessel allows efficient dissolution of ozone in the sludge, but is preferably of a diffuser-type or an ejector type. First, the sludge-containing liquid a is supplied to the ozone treatment vessel 11 at a predetermined flow rate. The ozone-containing gas d is supplied from the ozonizer 13 into the sludge-containing liquid a through the diffuser pipe 18, while a predetermined volume of the sludge-containing liquid a is stored in the ozone treatment vessel 11. Thus, the sludge and ozone react with each other, thereby foaming the sludge-containing liquid a. Through this reaction, strong cell walls of the sludge (microorganisms) are destroyed while carbonate groups (carbonate ions or bicarbonate ions) are removed. The mixer 19 is operated to rotate the bubble mixing blade 20 and the liquid mixing blade 21 provided at predetermined positions. Thus, the sludge adsorbed bubbles c and the residual liquid h containing the sludge remaining without being adsorbed on the bubbles are stirred, thereby accelerating the reaction between the sludge and ozone. The sludge adsorbed bubbles c and the residual liquid h rise by virtue of pressure of the ozone-containing gas d, and are supplied to the phosphorus elution vessel 12 through the bubble discharge port 22.

Here, the supply of the ozone-containing gas d is preferably 10 to 500 mg·$O_3$/g·SS, more preferably 20 to 400 mg·$O_3$/g·SS. A supply of the ozone-containing gas d of less than 10 mg·$O_3$/g·SS may reduce the phosphorus elution rate from the sludge because the microorganisms in the sludge cannot be sufficiently damaged. A supply of the ozone-containing gas d exceeding 500 mg·O₃/g·SS may result in high treatment cost because ozone is wasted.

Further, a ratio (G/L) of the ozone-containing gas supply to the sludge supply is preferably 0.05 or more. A ratio G/L of less than 0.05 may reduce the rate of oxidative decomposition reaction of the sludge because the bubbles barely generate.

The residence time of the sludge-containing liquid a in the ozone treatment vessel 11 is preferably 30 minutes or less. A residence time exceeding 30 minutes requires a large ozone treatment vessel 11, which may lead to a large sludge treatment apparatus 10.

Figure 3:
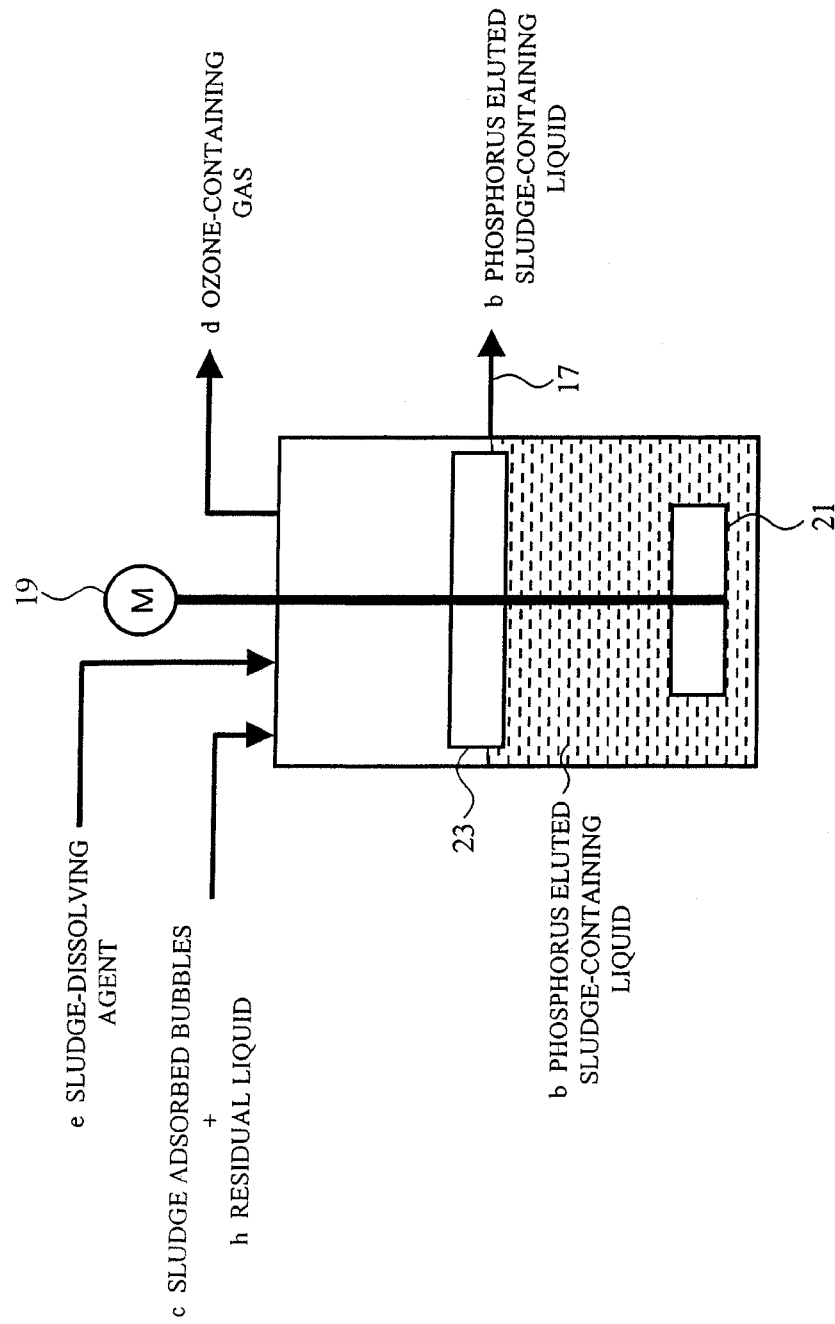
FIG. 3 is a diagram illustrating a phosphorus elution vessel of the sludge treatment apparatus according to Embodiment 1 of the present invention.

Next, the step of eluting phosphorus in the sludge into the liquid phase by bringing the sludge adsorbed bubbles c and the residual liquid h, and the sludge-dissolving agent into contact with each other in the phosphorus elution vessel 12 will be described specifically with reference to FIG. 3.

The phosphorus elution vessel 12 is provided with the mixer 19, the liquid mixing blade 21, and a defoaming blade 23. The sludge adsorbed bubbles c and the residual liquid h are supplied from the ozone treatment vessel 11 to the phosphorus elution vessel 12, while the sludge-dissolving agent e is supplied from the sludge-dissolving agent storage vessel 15 to the phosphorus elution vessel 12. The mixer 19 is operated to eliminate bubbles with the defoaming blade 23 and to mix the phosphorus eluted sludge-containing liquid b and the sludge-dissolving agent e with the liquid mixing blade 21, thereby accelerating phosphorus elution. The number of blades on the defoaming blade 23 is preferably larger than the number of blades on the liquid mixing blade 21 for efficient defoaming. The phosphorus eluted sludge-containing liquid b is discharged to the outside of the vessel through the discharge pipe 17. The liquid level in the phosphorus elution vessel 12 can be adjusted to a constant height by providing an overflow type discharge pipe 17 or by providing a liquid level sensor in the vessel to discharge the phosphorus eluted sludge-containing liquid b using a pump interlocked with the sensor. Of the ozone gas supplied to the ozone treatment vessel 11, any ozone gas which could not dissolve in the sludge-containing liquid a is decomposed into oxygen and discharged to the atmosphere by the waste ozone gas decomposition device 16 connected to the upper portion of the phosphorus elution vessel 12.

The residence time of the phosphorus eluted sludge-containing liquid b in the phosphorus elution vessel 12 is preferably 30 minutes or less. A residence time exceeding 30 minutes requires a large phosphorus elution vessel 12, which may lead to a large sludge treatment apparatus 26.

The method for supplying the sludge-dissolving agent e here is not particularly limited. The sludge-dissolving agent e may be supplied as a shower from the upper portion of the phosphorus elution vessel 12 or may be directly supplied just before the sludge adsorbed bubbles c and the residual liquid h are supplied to the phosphorus elution vessel 12.

The sludge in the phosphorus elution vessel 12 has a pH of preferably 10 or more, more preferably 13 or more, when an alkaline aqueous solution is used as the sludge-dissolving agent e. A pH of less than 10 may reduce the phosphorus elution rate because the dissolution of the sludge will not proceed. An example of a method of adjusting the pH of the sludge to the above values involves: providing a pH meter for measuring the pH of the sludge in the phosphorus elution vessel 12; and supplying the sludge-dissolving agent e in accordance with the pH measured. Alternatively, the volume of the alkaline aqueous solution added with respect to the sludge volume may be adjusted to a constant value instead of adjusting the pH of the sludge. In this case, the sludge preferably has a hydroxide ion concentration of 0.1 mmol/L or more.

The sludge in the phosphorus elution vessel 12 has a pH of preferably 4 or less, more preferably 3 or less, when an acidic aqueous solution is used as the sludge-dissolving agent e. A pH of the sludge exceeding 4 may reduce the phosphorus elution rate because the dissolution of the sludge will not proceed.

Figure 4:
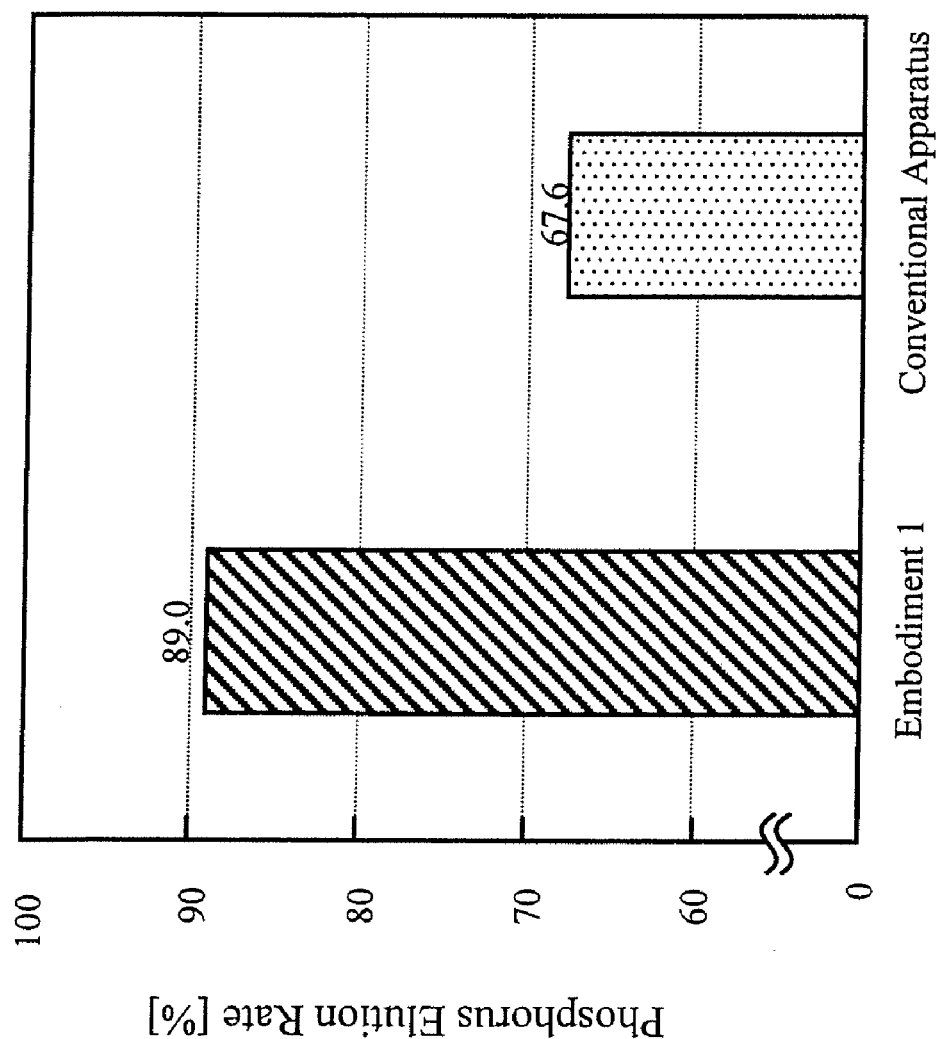
FIG. 4 is a graph showing a phosphorus elution rate in Embodiment 1.
Figure 5:
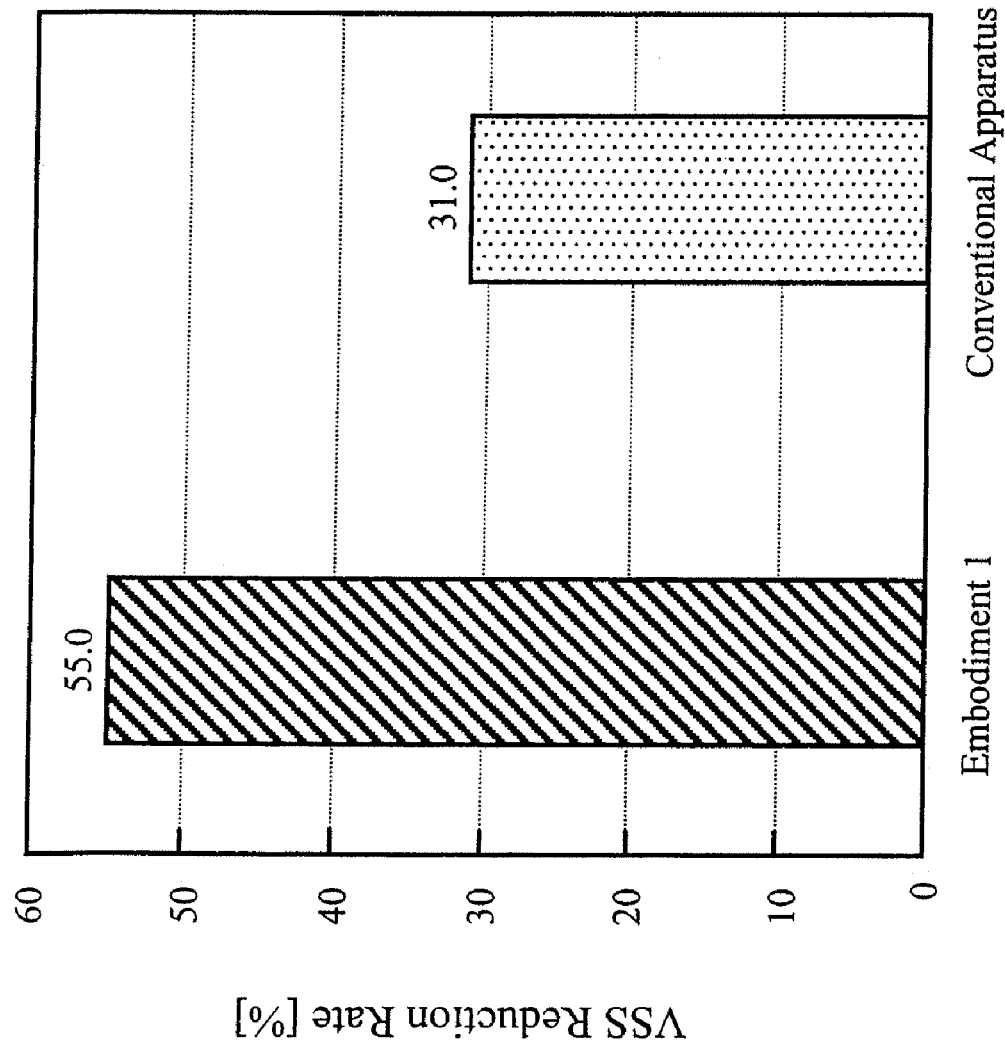
FIG. 5 is a graph showing a VSS reduction rate in Embodiment 1.

A sludge treatment experiment was carried out using such a sludge treatment apparatus 10 under the conditions of SS (Suspended solids) in the sludge of 4,300 mg/L, an ozone-containing gas supply of 180 mg·O₃/g·SS, a pH of the sludge in the phosphorus elution vessel of 13 (adjusted with 8 mol/L of sodium hydroxide solution), and treatment time of 30 minutes, to thereby determine a phosphorus elution rate from the sludge. FIG. 4 shows the results. Further, a VSS (Volatile suspended solids) reduction rate was determined under similar conditions. FIG. 5 shows the results.

A sludge treatment experiment was carried out using a conventional apparatus which involves alkali treatment after the ozone treatment under similar conditions, to thereby determine the phosphorus elution rate from the sludge. FIG. 4 shows the results. Further, the VSS reduction rate was determined under similar conditions, and FIG. 5 shows the results.

FIG. 4 clearly shows that the phosphorus elution rate remained at 67.6% with the conventional apparatus, while the phosphorus elution rate significantly improved to 89.0% with the sludge treatment apparatus 10. Further, FIG. 5 clearly shows that the VSS reduction rate from the sludge remained at 31% with the conventional apparatus, while the VSS reduction rate from the sludge significantly improved to 55.0% with the sludge treatment apparatus 10. The sludge treatment apparatus 10 of Embodiment 1 of the present invention has a large contact area between the sludge and ozone. Thus, the sludge treatment apparatus 10 allows efficient elution of phosphorus in the sludge into the liquid phase and significant sludge volume reduction during sludge treatment. In addition, such a phosphorus elution rate and a VSS reduction rate could not be attained in treatment lasting for a short time of 30 minutes through other conventional phosphorus elution treatments such as heat treatment or ultrasonic disintegration treatment.

Embodiment 2

Figure 6:
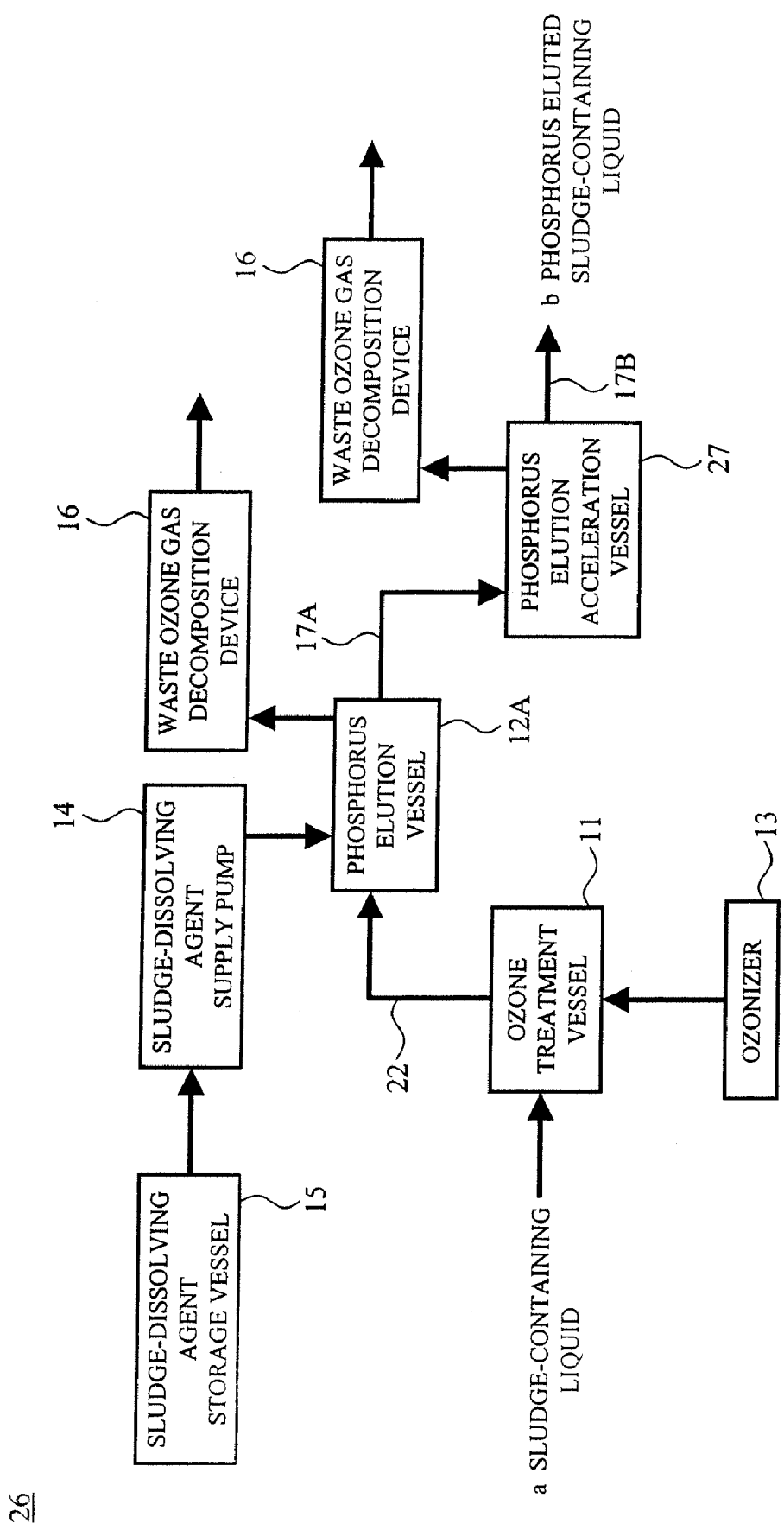
FIG. 6 is a block diagram showing a construction of a sludge treatment apparatus according to Embodiment 2 of the present invention.

FIG. 6 is a block diagram showing a construction of a sludge treatment apparatus 26 according to Embodiment 2 of the present invention.

In FIG. 6, the sludge treatment apparatus 26 is provided with an ozone treatment vessel 11, a phosphorus elution vessel 12A, and a phosphorus elution acceleration vessel 27. The phosphorus elution vessel 12A is connected downstream of the ozone treatment vessel 11, and the phosphorus elution acceleration vessel 27 is connected downstream of the phosphorus elution vessel 12A. A waste ozone gas decomposition device 16 is connected to an upper portion of both the phosphorus elution vessel 12A and the phosphorus elution acceleration vessel 27. Discharge pipes 17A and 17B, which discharge a phosphorus eluted sludge-containing liquid b, are provided in a bottom portion of the phosphorus elution vessel 12A and in a lower portion or middle portion of the phosphorus elution acceleration vessel 27. The other construction is the same as the construction shown in FIG. 1, and thus, the same portions as those in FIG.

1 are represented by the same reference, numerals and descriptions thereof are omitted in Embodiment 2 of the present invention.

Sludge treatment using such a sludge treatment apparatus 26 first involves supplying a sludge-containing liquid a generated from a sewage treatment plant (not shown) or the like to the ozone treatment vessel 11. Through blowing of ozone, sludge adsorbed bubbles c and a residual liquid h containing sludge that remains without being adsorbed on the bubbles are supplied to the phosphorus elution vessel 12A through a bubble discharge port 22. At the same time, a sludge-dissolving agent e including an alkaline aqueous solution such as an aqueous solution of sodium hydroxide or an aqueous solution of potassium hydroxide, and an acidic aqueous solution such as hydrochloric acid or sulfuric acid is supplied from a sludge-dissolving agent storage vessel 15 to the phosphorus elution vessel 12A through a sludge-dissolving agent supply pump 14. At this time in the phosphorus elution vessel 12A, the sludge adsorbed bubbles c are eliminated, while the sludge which is in an easily phosphorus-eluted state through ozone treatment and the sludge-dissolving agent e are brought into contact with each other for a reaction, thereby eluting a large amount of phosphorus in the sludge into a liquid phase. The phosphorus eluted sludge-containing liquid b is supplied to the phosphorus elution acceleration vessel 27 through the discharge pipe 17A. In the phosphorus elution acceleration vessel 27, the phosphorus eluted sludge-containing liquid b is further eluted into the liquid phase through mixing.

Figure 7:
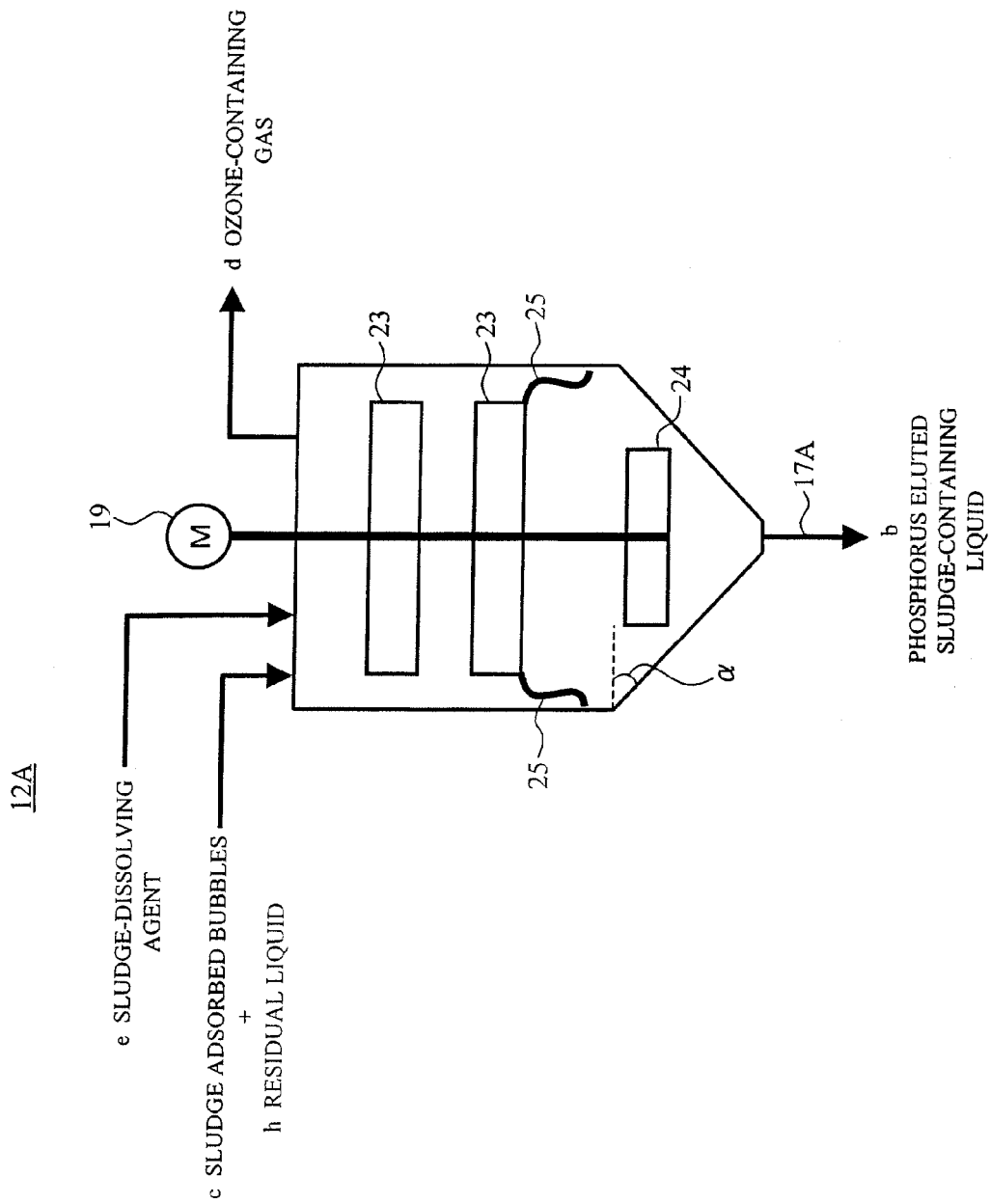
FIG. 7 is a diagram illustrating a phosphorus elution vessel of the sludge treatment apparatus according to Embodiment 2 of the present invention.

Next, the phosphorus elution vessel 12A will be described specifically with reference to FIG. 7.

The phosphorus elution vessel 12A is provided with a mixer 19, a defoaming blade 23, a bottom portion mixing blade 24, and a blade appendant 25. The sludge adsorbed bubbles c and the residual liquid h are supplied from the ozone treatment vessel 11 to the phosphorus elution vessel 12A, while the sludge-dissolving agent e is supplied from the sludge-dissolving agent storage vessel 15 to the phosphorus elution vessel 12A. The sludge which is in an easily phosphorus-eluted state and the sludge-dissolving agent e react with each other, to thereby elute a large amount of phosphorus in the sludge into the liquid phase. The mixer 19 is operated to eliminate bubbles with the defoaming blade 23. The bubbles remaining are eliminated by coming into contact with the blade appendant 25 made of silicone tubes or the like. Through this reaction, strong cell walls of the sludge (microorganisms) are further fragmented, and the sludge is modified (barely biodegradable substances become easily biodegradable). The phosphorus eluted sludge-containing liquid b falls to a bottom portion of the phosphorus elution vessel 12A, is further stirred by the bottom portion mixing blade 24, and is discharged to the outside of the vessel through the discharge pipe 17A. Here, the bottom portion of the phosphorus elution vessel 12A preferably has an angle of inclination α of 10° or more, so that the sludge may fall smoothly. Of the ozone gas supplied to the ozone treatment vessel 11, any ozone gas which could not dissolve in the sludge-containing liquid a is decomposed into oxygen and discharged to the atmosphere by the waste ozone gas decomposition device 16 connected to the upper portion of the phosphorus elution vessel 12.

Figure 8:
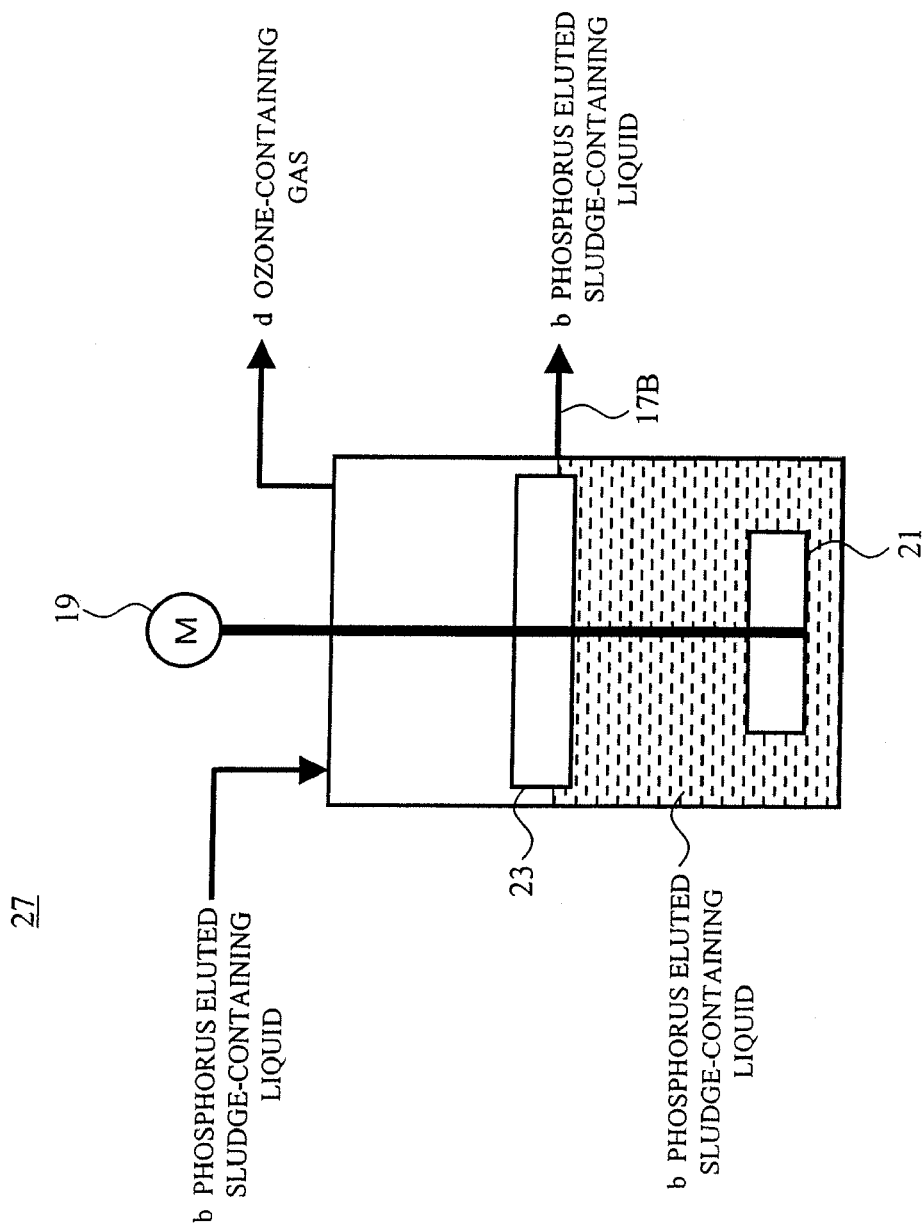
FIG. 8 is a diagram illustrating a phosphorus elution acceleration vessel of the sludge treatment apparatus according to Embodiment 2 of the present invention.

Next, the phosphorus elution acceleration vessel 27 will be described specifically with reference to FIG. 8.

The phosphorus elution acceleration vessel 27 is provided with a mixer 19, a liquid mixing blade 21, and a defoaming blade 23. The phosphorus eluted sludge-containing liquid b is supplied from the phosphorus elution vessel 12A to the phosphorus elution acceleration vessel 27. The mixer 19 is operated to eliminate bubbles partially remaining in the phosphorus elution vessel 12A or bubbles generated through mixing with the defoaming blade 23, and to further mix the phosphorus eluted sludge-containing liquid b with the liquid mixing blade 21, thereby accelerating phosphorus elution. The phosphorus eluted sludge-containing liquid b is discharged to the outside of the vessel through the discharge pipe 17B. The liquid level in the phosphorus elution acceleration vessel 27 here can be adjusted to a constant height by providing an overflow type discharge pipe 17B or by providing a liquid level sensor in the vessel to discharge the phosphorus eluted sludge-containing liquid b using a pump interlocked with the sensor. Any ozone gas which could not dissolve in the sludge-containing liquid a is decomposed into oxygen and discharged to the atmosphere by the waste ozone gas decomposition device 16 connected to the upper portion of the phosphorus elution acceleration vessel 27.

The residence time of the phosphorus eluted sludge-containing liquid b in the phosphorus elution acceleration vessel 27 is preferably 30 minutes or less. A residence time exceeding 30 minutes requires a large phosphorus elution acceleration vessel 27, which may lead to a large sludge treatment apparatus 26.

According to Embodiment 2 of the present invention, a long contact time is provided between the sludge and the sludge-dissolving agent e, thereby further improving the phosphorus elution rate. Further, the sludge and the bubbles are completely separated, and thus, no bubbles are delivered into the waste ozone gas decomposition device 16, thereby preventing contamination of the waste ozone gas decomposition device 16.

In Embodiment 2 of the present invention, the sludge-dissolving agent e is supplied to the phosphorus elution vessel 12A, but the sludge-dissolving agent e may be supplied to both the phosphorus elution vessel 12A and the phosphorus elution acceleration vessel 27. The method for supplying the sludge-dissolving agent e is not particularly limited. The sludge-dissolving agent e may be supplied as a shower from the upper portion of both of the vessels (phosphorus elution vessel 12A and phosphorus elution acceleration vessel 27). Alternatively, the sludge-dissolving agent e may be directly supplied just before the sludge adsorbed bubbles c and the residual liquid h are supplied, or the phosphorus eluted sludge-containing liquid b is supplied to both of the vessels.

Embodiment 3

Figure 9:
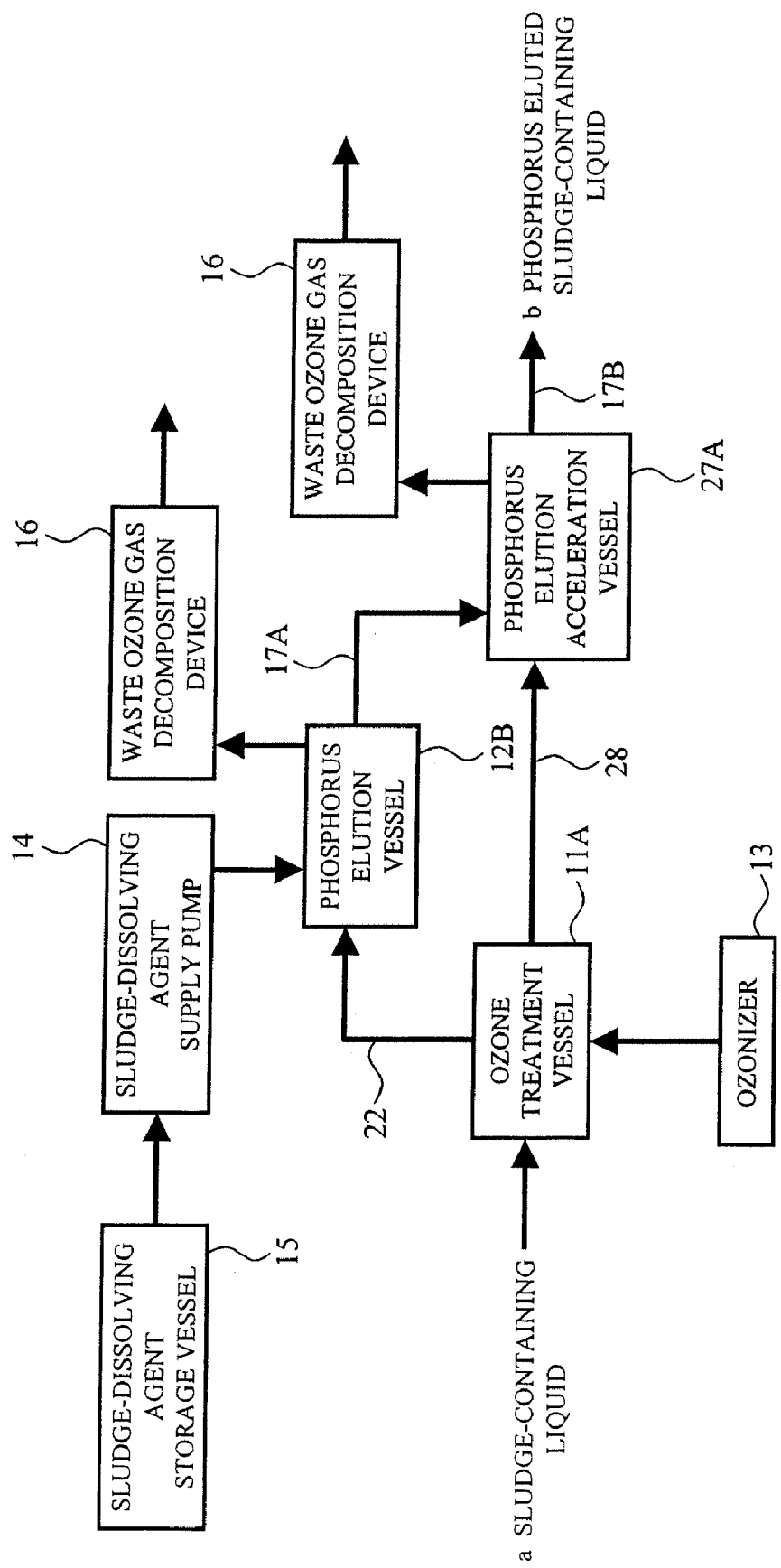
FIG. 9 is a block diagram showing a construction of a sludge treatment apparatus according to Embodiment 3 of the present invention.

FIG. 9 is a block diagram showing a construction of a sludge treatment apparatus 29 according to Embodiment 3 of the present invention.

Figure 10:
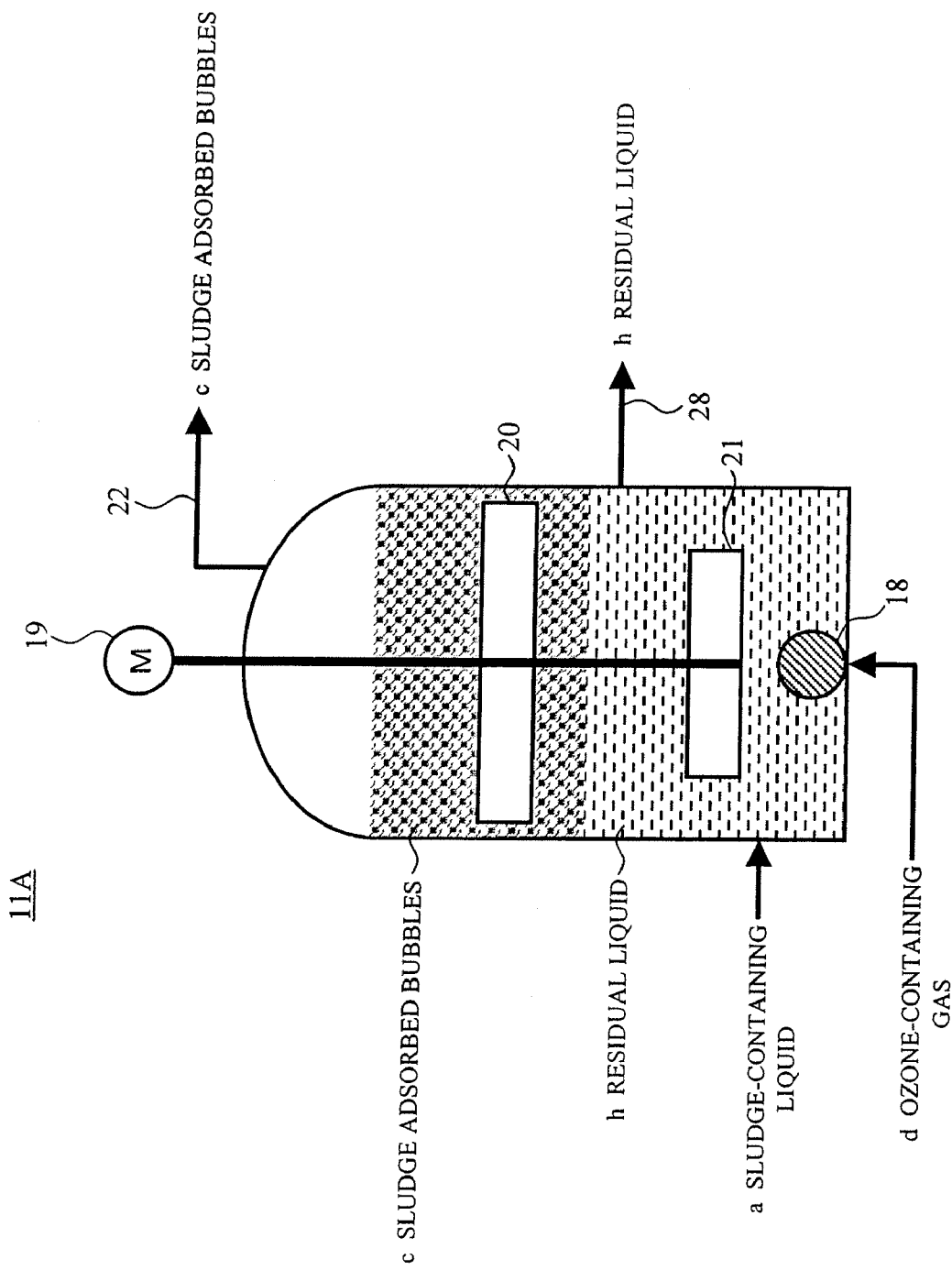
FIG. 10 is a diagram illustrating an ozone treatment vessel of the sludge treatment apparatus according to Embodiment 3 of the present invention.

In FIG. 9, the sludge treatment apparatus 29 is provided with an ozone treatment vessel 11A, a phosphorus elution vessel 12B, and a phosphorus elution acceleration vessel 27A. As shown in FIG. 10, an overflow type residual liquid discharge port is provided in a lower portion or middle portion of the ozone treatment vessel 11A, and the residual liquid discharge port of the ozone treatment vessel 11A is connected to the phosphorus elution acceleration vessel 27A through a residual liquid discharge pipe 28. The other construction is the same as the construction shown in FIG. 6, and thus, the same portions as those in FIG. 6 are represented by the same reference, numerals and descriptions thereof are omitted in Embodiment 3 of the present invention.

Sludge treatment using such a sludge treatment apparatus 29 first involves supplying a sludge-containing liquid a generated from a sewage treatment plant (not shown) or the like to the ozone treatment vessel 11A. Through blowing of ozone, sludge adsorbed bubbles c are supplied to the phosphorus elution vessel 12B through a bubble discharge port 22. At the same time, a sludge-dissolving agent e including an alkaline aqueous solution such as an aqueous solution of sodium hydroxide or an aqueous solution of potassium hydroxide, and an acidic aqueous solution such as hydrochloric acid or sulfuric acid is supplied from a sludge-dissolving agent storage vessel 15 to the phosphorus elution vessel 12B through a sludge-dissolving agent supply pump 14. At this time in the phosphorus elution vessel 12B, the sludge adsorbed bubbles c are eliminated and the sludge which is in an easily phosphorus-eluted state through ozone treatment and the sludge-dissolving agent e are brought into contact with each other for a reaction, thereby eluting a large amount of phosphorus in the sludge into the liquid phase. A phosphorus eluted sludge-containing liquid b is supplied from the phosphorus elution vessel 12B to the phosphorus elution acceleration vessel 27A through a discharge pipe 17A, while a residual liquid h containing sludge that remains without being adsorbed on the bubbles is directly supplied from the ozone treatment vessel 11A to the phosphorus elution acceleration vessel 27A through the residual liquid discharge pipe 28. Thus, in the phosphorus elution acceleration vessel 27A, the phosphorus eluted sludge-containing liquid b and the residual liquid h are mixed.

A boundary between the sludge adsorbed bubbles c and the residual liquid h can be maintained constant by adjusting a pressure balance between the sludge adsorbed bubbles c and the residual liquid h, that is, by: adjusting a liquid level in the phosphorus elution acceleration vessel 27A (adjusting to a position higher than the boundary between the sludge adsorbed bubbles c and the residual liquid h), when the liquid level in the phosphorus elution acceleration vessel 27A is higher than the highest part of the residual liquid discharge pipe 28; and adjusting the height of the highest part of the residual liquid discharge pipe 28 (adjusting to a position higher than the boundary between the sludge adsorbed bubbles c and the residual liquid h), when the highest part of the residual liquid discharge pipe 28 is higher than the liquid level in the phosphorus elution acceleration vessel 27A.

Most of the sludge is adsorbed on the bubbles in the ozone treatment vessel 11A, and thus, most phosphorus in the sludge-containing liquid a elutes in the phosphorus elution vessel 12B. Thus, the residual liquid h contains only about several % to several tens % of SS in the sludge-containing liquid a, and the residual liquid contains hardly any phosphorus.

Figure 11:
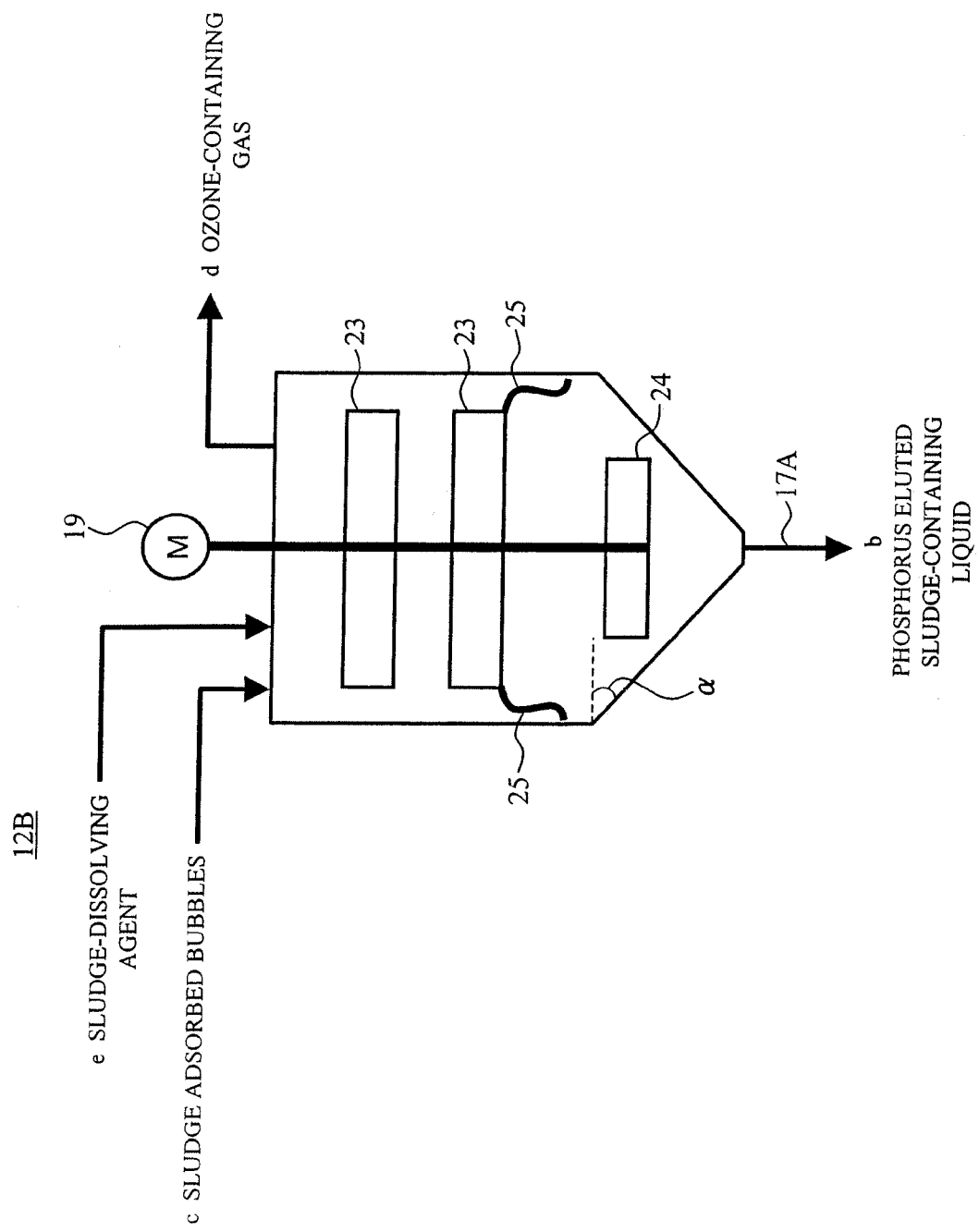
FIG. 11 is a diagram illustrating a phosphorus elution vessel of the sludge treatment apparatus according to Embodiment 3 of the present invention.

Next, the phosphorus elution vessel 12B will be described specifically with reference to FIG. 11.

The phosphorus elution vessel 12B is provided with a mixer 19, a defoaming blade 23, a bottom portion mixing blade 24, and a blade appendant 25. The sludge adsorbed bubbles c and the residual liquid h are supplied from the ozone treatment vessel 11A to the phosphorus elution vessel 12B, while the sludge-dissolving agent e is supplied from the sludge-dissolving agent storage vessel 15 to the phosphorus elution vessel 12B. The sludge which is in an easily phosphorus-eluted state and the sludge-dissolving agent e react with each other, thereby eluting a large amount of phosphorus in the sludge into a liquid phase. The mixer 19 is operated to eliminate bubbles with the defoaming blade 23. The bubbles remaining are eliminated by coming into contact with the blade appendant 25 made of silicone tubes or the like. Through this reaction, strong cell walls of the sludge (microorganisms) are further fragmented, and the sludge is modified (barely biodegradable substances become easily biodegradable). The phosphorus eluted sludge-containing liquid b falls to a bottom portion of the phosphorus elution vessel 12B, is further stirred by the bottom portion mixing blade 24, and is discharged to the outside of the vessel through the discharge pipe 17A. Here, the bottom portion of the phosphorus elution vessel 12B preferably has an angle of inclination $\alpha$ of 10° or more, so that the sludge may fall smoothly. Of the ozone gas supplied to the ozone treatment vessel 11A, any ozone gas which could not dissolve in the sludge-containing liquid a is decomposed into oxygen and discharged to the atmosphere by the waste ozone gas decomposition device 16 connected to the upper portion of the phosphorus elution vessel 12B.

Figure 12:
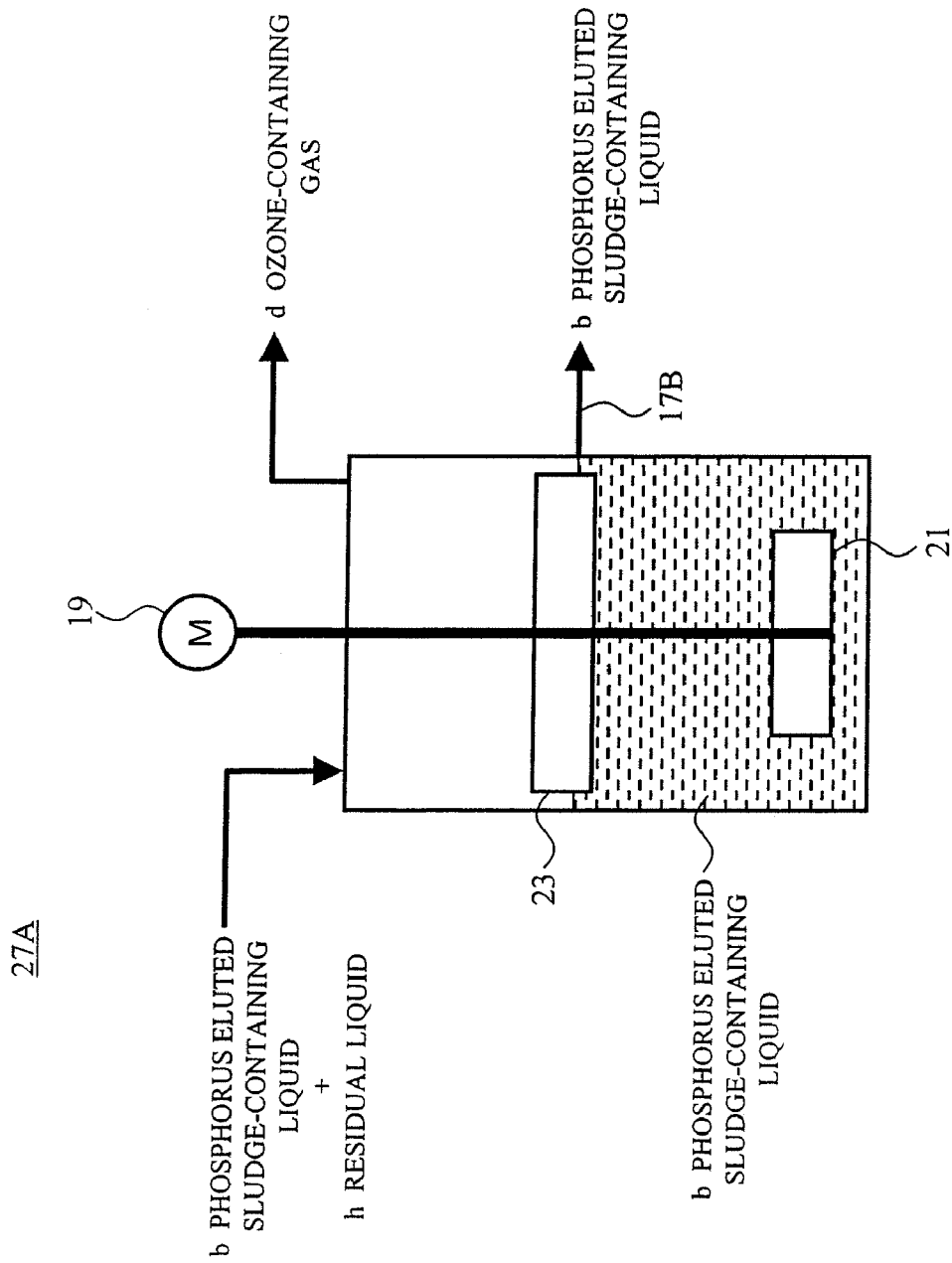
FIG. 12 is a diagram illustrating a phosphorus elution acceleration vessel of the sludge treatment apparatus according to Embodiment 3 of the present invention.

Next, the phosphorus elution acceleration vessel 27A will be described specifically with reference to FIG. 12.

The phosphorus elution acceleration vessel 27A is provided with a mixer 19, a liquid mixing blade 21, and a defoaming blade 23. The phosphorus eluted sludge-containing liquid b is supplied from the phosphorus elution vessel 12B to the phosphorus elution acceleration vessel 27A, while the residual liquid h is directly supplied from the ozone treatment vessel 11A to the phosphorus elution acceleration vessel 27A. The mixer 19 is operated to eliminate bubbles partially remaining in the phosphorus elution vessel 12B or bubbles generated through mixing with the defoaming blade 23 and to mix the phosphorus eluted sludge-containing liquid b and the residual liquid h with the liquid mixing blade 21, thereby accelerating phosphorus elution. The phosphorus eluted sludge-containing liquid b is discharged to the outside of the vessel through the discharge pipe 17B. The liquid level in the phosphorus elution acceleration vessel 27A can be adjusted to a constant height by providing an overflow type discharge pipe 17B or by providing a liquid level sensor in the vessel to discharge the phosphorus eluted sludge-containing liquid b using a pump interlocked with the sensor. Any ozone gas which could not dissolve in the sludge-containing liquid a is decomposed into oxygen and discharged to the atmosphere by the waste ozone gas decomposition device 16 connected to the upper portion of the phosphorus elution acceleration vessel 27A.

The residence time of the phosphorus eluted sludge-containing liquid b in the phosphorus elution acceleration vessel 27A is preferably 30 minutes or less. A residence time exceeding 30 minutes requires a large phosphorus elution acceleration vessel 27A, which may lead to a large sludge treatment apparatus 29.

According to Embodiment 3 of the present invention, the sludge adsorbed bubbles c and the residual liquid h are separated, thereby allowing efficient elution of phosphorus from the sludge through the addition of the sludge-dissolving agent e. That is, the effect of addition of the sludge-dissolving agent e can be enhanced through an efficient reaction between the sludge and ozone because ozone is not wasted through a reaction with dissolved components in the sludge-containing liquid a.

In Embodiment 3 of the present invention, the sludge-dissolving agent e is supplied to the phosphorus elution vessel 12B, but the sludge-dissolving agent e may be supplied to both the phosphorus elution vessel 12B and the phosphorus elution acceleration vessel 27A. The method for supplying the sludge-dissolving agent e is not particularly limited. The sludge-dissolving agent e may be supplied as a shower from the upper portion of both of the vessels (phosphorus elution vessel 12B and phosphorus elution acceleration vessel 27A). Alternatively, the sludge-dissolving agent e may be directly supplied just before the sludge adsorbed bubbles c and the residual liquid h are supplied or the phosphorus eluted sludge-containing liquid b is supplied to both of the vessels.

Embodiment 4

Figure 13:
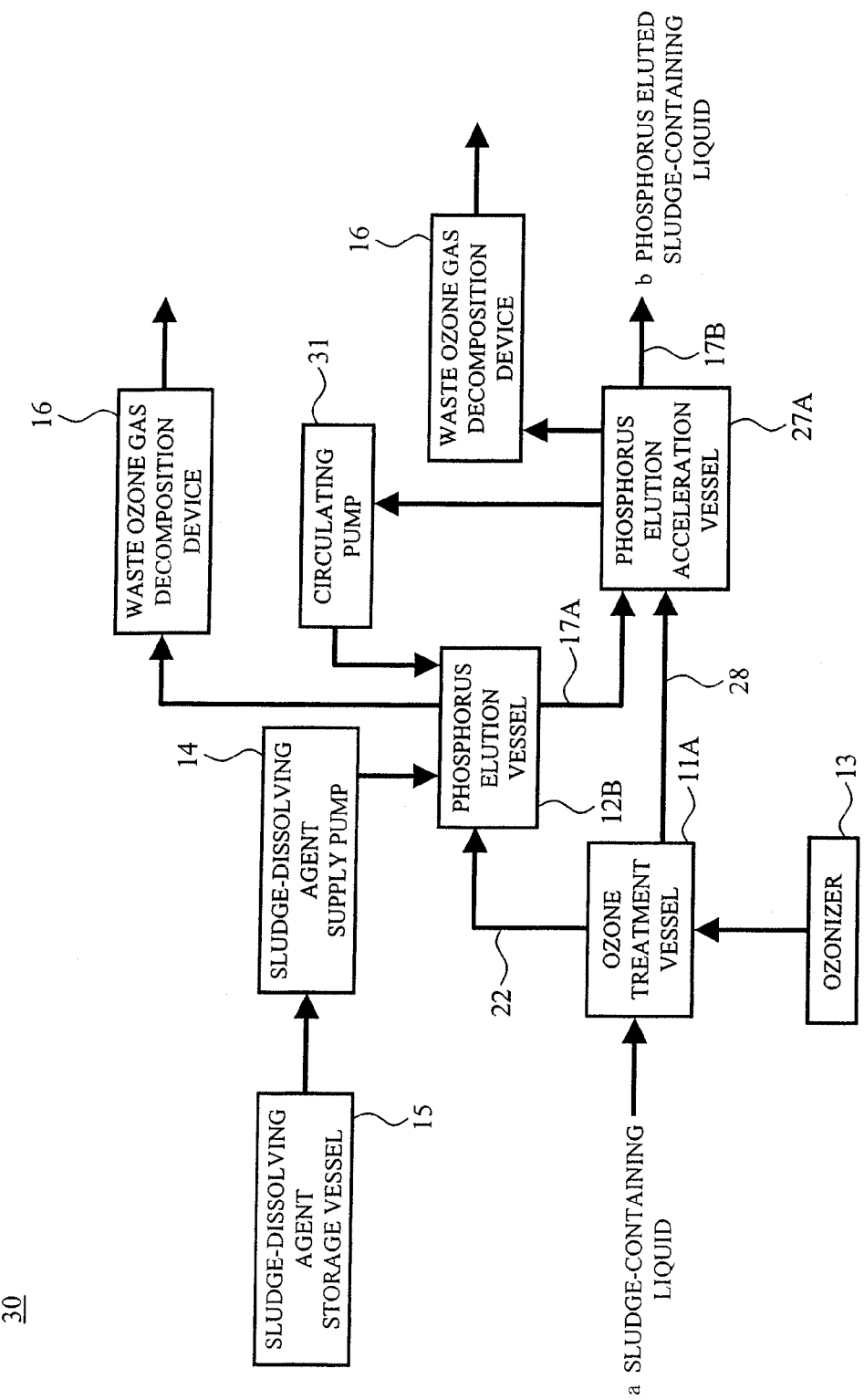
FIG. 13 is a block diagram showing a construction of a sludge treatment apparatus according to Embodiment 4 of the present invention.

FIG. 13 is a diagram illustrating a sludge treatment apparatus according to Embodiment 4 of the present invention.

In Embodiment 4, a phosphorus elution acceleration vessel 27A is connected to a phosphorus elution vessel 12B through a circulating pump 31 to partially return a phosphorus eluted sludge-containing liquid b in the phosphorus elution acceleration vessel 27A to the phosphorus elution vessel 12B. The other construction is the same as the construction shown in FIG. 9, and thus, the same portions as those in FIG. 9 are represented by the same reference, numerals and descriptions thereof are omitted in Embodiment 4 of the present invention.

Sludge treatment using such a sludge treatment apparatus 30 first involves supplying a sludge-containing liquid a generated from a sewage treatment plant (not shown) or the like to the ozone treatment vessel 11A. Through blowing of ozone, sludge adsorbed bubbles c are supplied to the phosphorus elution vessel 12B through a bubble discharge port 22. At the same time, a sludge-dissolving agent e including an alkaline aqueous solution such as an aqueous solution of sodium hydroxide or an aqueous solution of potassium hydroxide, and an acidic aqueous solution such as hydrochloric acid or sulfuric acid is supplied from a sludge-dissolving agent storage vessel 15 to the phosphorus elution vessel 12B through a sludge-dissolving agent supply pump 14. At this time in the phosphorus elution vessel 12B, the sludge adsorbed bubbles c are eliminated, while the sludge which is in an easily phosphorus-eluted state through ozone treatment and the sludge-dissolving agent e are brought into contact with each other for a reaction, thereby eluting a large amount of phosphorus in the sludge into a liquid phase. The phosphorus eluted sludge-containing liquid b is supplied from the phosphorus elution vessel 12 to the phosphorus elution acceleration vessel 27A through a discharge pipe 17A, while a residual liquid h containing the sludge that remains without being adsorbed on the bubbles is directly supplied from the ozone treatment vessel 11A to the phosphorus elution acceleration vessel 27A through a residual liquid discharge pipe 28. Thus, the phosphorus eluted sludge-containing liquid b and the residual liquid h are mixed in the phosphorus elution acceleration vessel 27A. The phosphorus eluted sludge-containing liquid b and the residual liquid h are partially returned to the phosphorus elution vessel 12B through the circulating pump 31, and phosphorus in the sludge is further eluted into the liquid phase in the phosphorus elution vessel 12B.

A boundary between the sludge adsorbed bubbles c and the residual liquid h in the ozone treatment vessel 11A can be maintained constant by adjusting a pressure balance between the sludge adsorbed bubbles c and the residual liquid h as in Embodiment 3 of the present invention.

According to Embodiment 4 of the present invention, the phosphorus eluted sludge-containing liquid b and the residual liquid h are partially returned to the phosphorus elution vessel 12B for repeated phosphorus elution, thereby further improving the phosphorus elution rate while maintaining a large sludge treatment volume.

In Embodiment 4 of the present invention, the sludge-dissolving agent e was supplied to the phosphorus elution vessel 12B, but the sludge-dissolving agent e may be supplied to both the phosphorus elution vessel 12B and the phosphorus elution acceleration vessel 27A. The method for supplying the sludge-dissolving agent e is not particularly limited. The sludge-dissolving agent e may be supplied as a shower from the upper portion of both of the vessels (phosphorus elution vessel 12B and phosphorus elution acceleration vessel 27A). Alternatively, the sludge-dissolving agent e may be directly supplied just before the sludge adsorbed bubbles c and the residual liquid h are supplied or the phosphorus eluted sludge-containing liquid b is supplied to both of the vessels.

Embodiment 5

Figure 14:
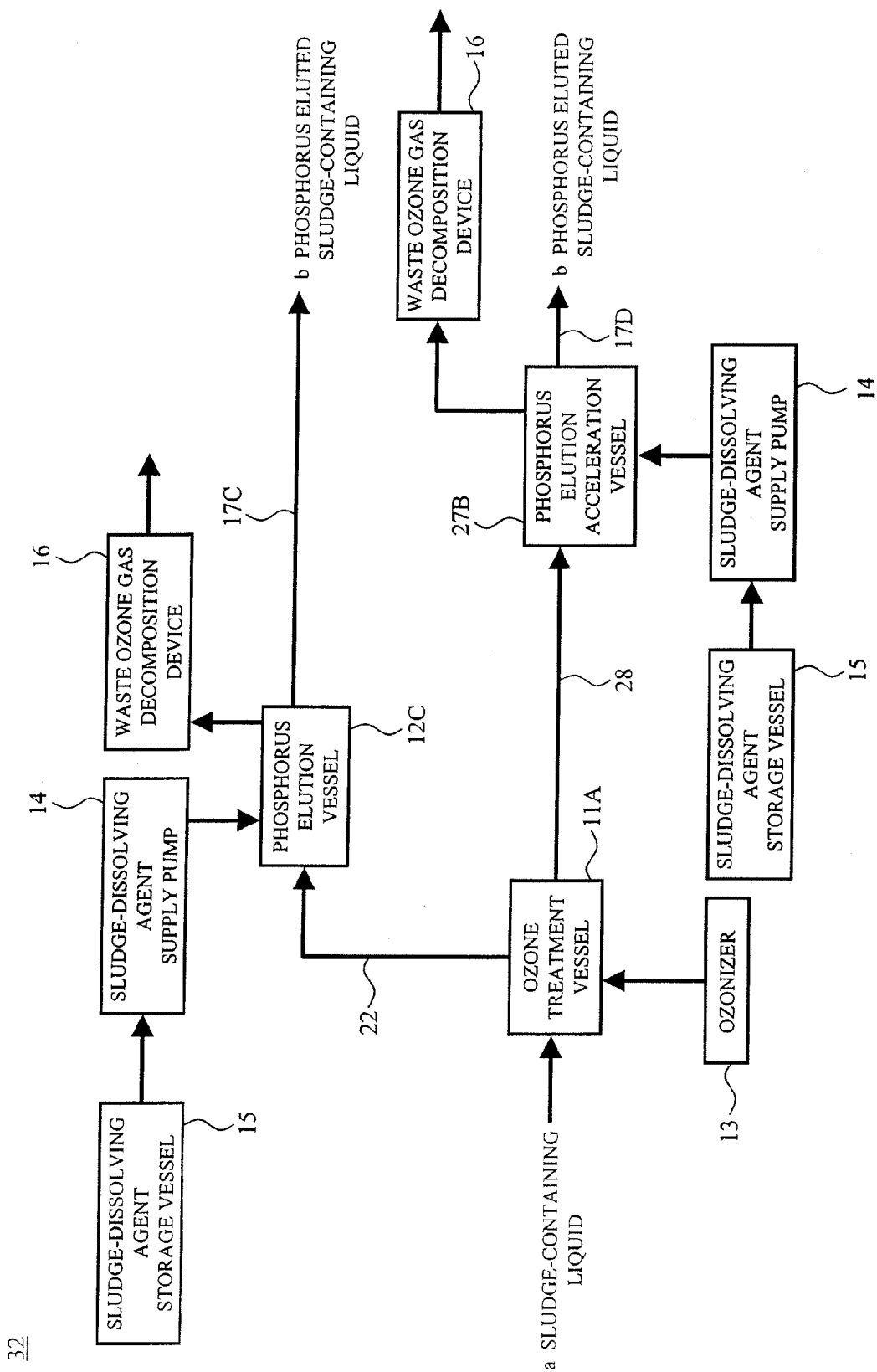
FIG. 14 is a block diagram showing a construction of a sludge treatment apparatus according to Embodiment 5 of the present invention.

FIG. 14 is a diagram illustrating a sludge treatment apparatus 32 according to Embodiment 5 of the present invention.

In FIG. 14, the sludge treatment apparatus 32 is provided with an ozone treatment vessel 11A, a phosphorus elution vessel 12C, and a phosphorus elution acceleration vessel 27B. The ozone treatment vessel 11A is connected to the phosphorus elution vessel 12C through a bubble discharge port 22 provided in an upper portion of the ozone treatment vessel 11A. An overflow type residual liquid discharge port provided in a lower portion or middle portion of the ozone treatment vessel 11A is connected to the phosphorus elution acceleration vessel 27B through a residual liquid discharge pipe 28. The phosphorus elution vessel 12C and the phosphorus elution acceleration vessel 27B are each connected to a sludge-dissolving agent storage vessel 15, which temporarily stores a sludge-dissolving agent e, through a sludge-dissolving agent supply pump 14. Discharge pipes 17C and 17D which discharge the phosphorus eluted sludge-containing liquid b are each provided in a lower portion or middle portion of the phosphorus elution vessel 12C and the phosphorus elution acceleration vessel 27B. The other construction is the same as the construction shown in FIG. 9, and thus, the same portions as those in FIG. 9 are represented by the same reference, numerals and descriptions thereof are omitted in Embodiment 5 of the present invention.

Sludge treatment using such a sludge treatment apparatus 32 first involves supplying a sludge-containing liquid a generated from a sewage treatment plant (not shown) or the like to the ozone treatment vessel 11A. Through blowing of ozone, sludge adsorbed bubbles c are supplied to the phosphorus elution vessel 12C through the bubble discharge port 22. At the same time, the sludge-dissolving agent e including an alkaline aqueous solution such as an aqueous solution of sodium hydroxide or an aqueous solution of potassium hydroxide, and an acidic aqueous solution such as hydrochloric acid or sulfuric acid is supplied from the sludge-dissolving agent storage vessel 15 to the phosphorus elution vessel 12C through the sludge-dissolving agent supply pump 14. At this time in the phosphorus elution vessel 12C, the sludge adsorbed bubbles c are eliminated, while the sludge which is in an easily phosphorus-eluted state through ozone treatment and the sludge-dissolving agent e are brought into contact with each other for a reaction, thereby eluting a large amount of phosphorus in the sludge into the liquid phase. The residual liquid h containing the sludge that remains without being adsorbed on the bubbles is directly supplied from the ozone treatment vessel 11A to the phosphorus elution acceleration vessel 27B through the residual liquid discharge pipe 28. At the same time, the sludge-dissolving agent e is supplied from the sludge-dissolving agent storage vessel 15 to the phosphorus elution vessel 12C through the sludge-dissolving agent supply pump 14. At this time, a slight amount of phosphorus from a small volume of the sludge in the residual liquid h elutes into the liquid phase.

The boundary between the sludge adsorbed bubbles c and the residual liquid h in the ozone treatment vessel 11A can be maintained constant by adjusting a pressure balance between the sludge adsorbed bubbles c and the residual liquid h as in Embodiment 3.

Figure 15:
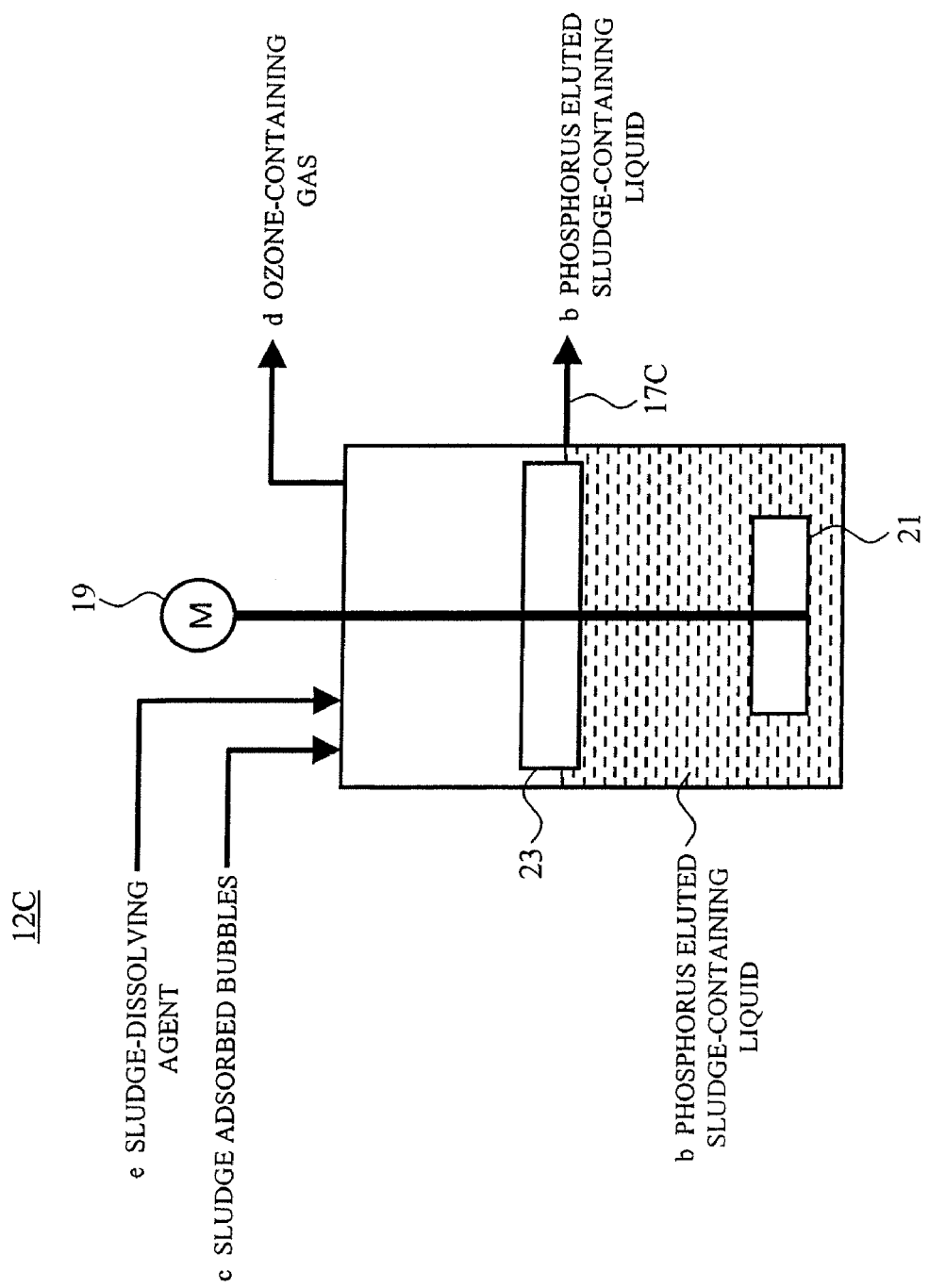
FIG. 15 is a diagram illustrating a phosphorus elution vessel of the sludge treatment apparatus according to Embodiment 5 of the present invention.

Next, the phosphorus elution vessel 12C will be described specifically with reference to FIG. 15.

The phosphorus elution vessel 12C is provided with a mixer 19, a liquid mixing blade 21, and a defoaming blade 23. The sludge adsorbed bubbles c are supplied from the ozone treatment vessel 11A to the phosphorus elution vessel 12C, while the sludge-dissolving agent e is supplied from the sludge-dissolving agent storage vessel 15 to the phosphorus elution vessel 12C. The mixer 19 is operated to eliminate bubbles with the defoaming blade 23 and to mix the phosphorus eluted sludge-containing liquid b and the sludge-dissolving agent e with the liquid mixing blade 21. The sludge which is in an easily phosphorus-eluted state and the sludge-dissolving agent e react with each other, thereby eluting a large amount of phosphorus in the sludge into a liquid phase. Through this reaction, strong cell walls of the sludge (microorganisms) are further fragmented, and the sludge is modified (barely biodegradable substances become easily biodegradable). The number of blades on the defoaming blade 23 is preferably larger than the number of blades on the liquid mixing blade 21 for efficient defoaming. The phosphorus eluted sludge-containing liquid b is discharged to the outside of the vessel through the discharge pipe 17C. The liquid level in the phosphorus elution vessel 12C can be adjusted to a constant height by providing an overflow type discharge pipe 17C or by providing a liquid level sensor in the vessel to discharge the phosphorus eluted sludge-containing liquid b using a pump interlocked with the sensor. Any ozone gas which could not dissolve in the sludge-containing liquid a is decomposed into oxygen and discharged to the atmosphere by the waste ozone gas decomposition device 16 connected to the upper portion of the phosphorus elution vessel 12C.

The residence time of the phosphorus eluted sludge-containing liquid b in the phosphorus elution vessel 12C is preferably 30 minutes or less. A residence time exceeding 30 minutes requires a large phosphorus elution vessel 12C, which may lead to a large sludge treatment apparatus 32.

Figure 16:
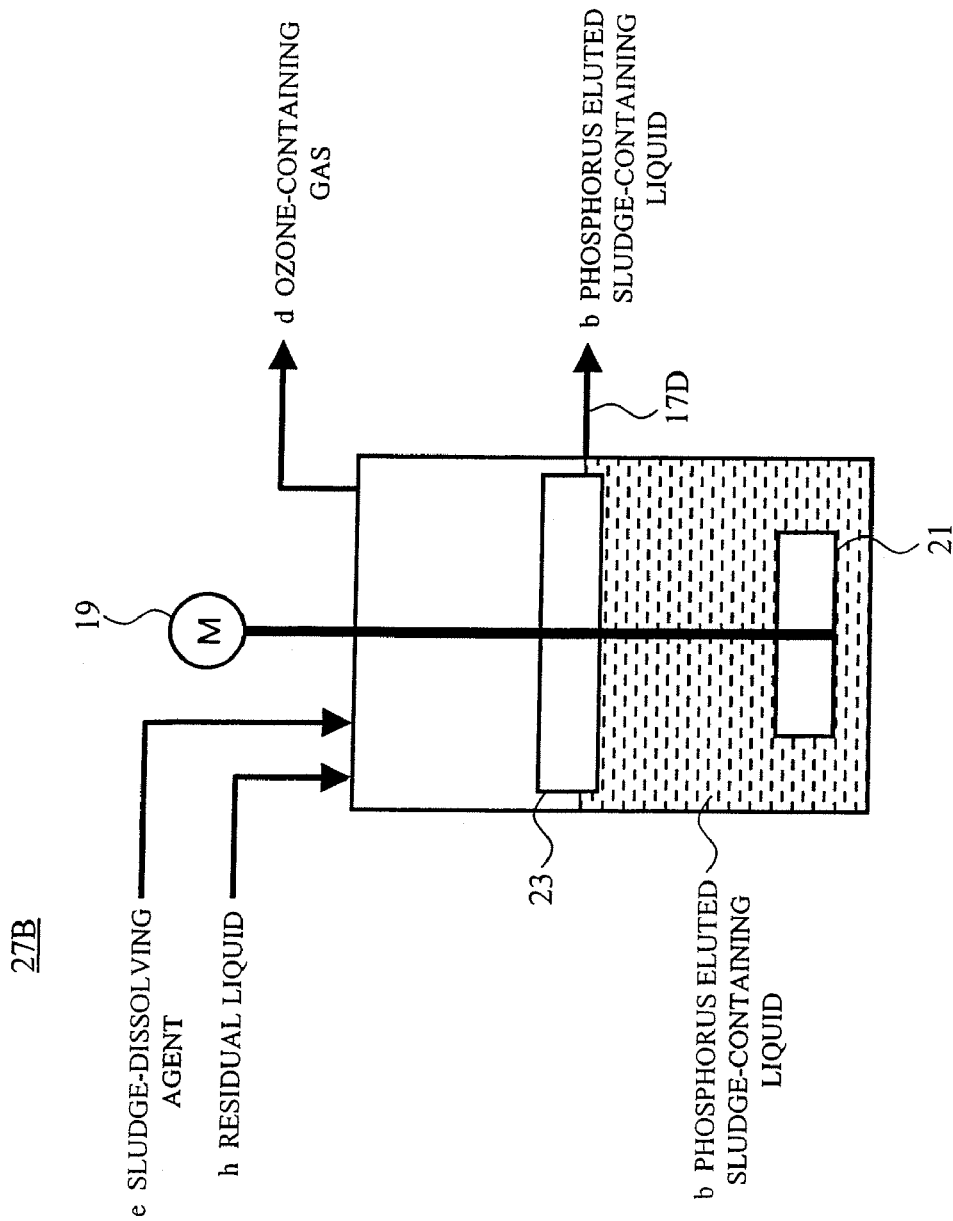
FIG. 16 is a diagram illustrating a phosphorus elution acceleration vessel of the sludge treatment apparatus according to Embodiment 5 of the present invention.

Next, the phosphorus elution acceleration vessel 27B will be described specifically with reference to FIG. 16.

The phosphorus elution acceleration vessel 27B is provided with a mixer 19, a liquid mixing blade 21, and a defoaming blade 23. The residual liquid h is directly supplied from the ozone treatment vessel 11A to the phosphorus elution acceleration vessel 27B, while the sludge-dissolving agent e is supplied from the sludge-dissolving agent storage vessel 15 to the phosphorus elution acceleration vessel 27B. The mixer 19 is operated to mix the residual liquid h and the sludge-dissolving agent e with the defoaming blade 23 and the liquid mixing blade 21. The defoaming blade 23 may be removed if bubbles do not generate through mixing or the like. A slight amount of phosphorus from a small volume of the sludge in the residual liquid h elutes into the liquid phase. The phosphorus eluted sludge-containing liquid b is discharged to the outside of the vessel through the discharge pipe 17D. The liquid level in the phosphorus elution acceleration vessel 27B can be adjusted to a constant height by providing an overflow type discharge pipe 17D or by providing a liquid level sensor in the vessel to discharge the phosphorus eluted sludge-containing liquid b using a pump interlocked with the sensor. Any ozone gas which could not dissolve in the sludge-containing liquid a is decomposed into oxygen and discharged to the atmosphere by the waste ozone gas decomposition device 16 connected to the upper portion of the phosphorus elution acceleration vessel 27B.

In Embodiment 5 of the present invention, most of the sludge is adsorbed on the bubbles in the ozone treatment vessel 11A, and thus, the volume of the sludge remaining in the residual liquid h is small and the residual liquid h contains only about several % to several tens % of SS in the sludge-containing liquid a. Thus, the sludge-dissolving agent e may be added and mixed into the phosphorus elution vessel 12C, to thereby elute phosphorus. On the other hand, the sludge-dissolving agent e need not be added to the phosphorus elution acceleration vessel 27B, to thereby return the residual liquid h to a water treatment system as it is. Thus, sludge treatment volume may be reduced.

The residence time of the phosphorus eluted sludge-containing liquid b in the phosphorus elution acceleration vessel 27B is preferably 30 minutes or less. A residence time exceeding 30 minutes requires a large phosphorus elution acceleration vessel 27B, which may lead to a large sludge treatment apparatus 32.

According to Embodiment 5 of the present invention, the sludge-dissolving agent e can be added depending on the phosphorus content in the bubbles c with the sludge adsorbed and in the residual liquid h. That is, the amount of the sludge-dissolving agent e added can be adjusted depending on the volume of the sludge, the phosphorus content, and the like, thereby effectively maintaining a high phosphorus elution rate.

In Embodiment 5 of the present invention, the method for supplying the sludge-dissolving agent e is not particularly limited. The sludge-dissolving agent e may be supplied as a shower from the upper portion of both the phosphorus elution vessel 12C and the phosphorus elution acceleration vessel 27B. Alternatively, the sludge-dissolving agent e may be directly supplied just before the sludge adsorbed bubbles c and the residual liquid h are supplied or the phosphorus eluted sludge-containing liquid b is supplied to the phosphorus elution vessel 12C and the phosphorus elution acceleration vessel 27B.

Embodiment 6

Figure 17:
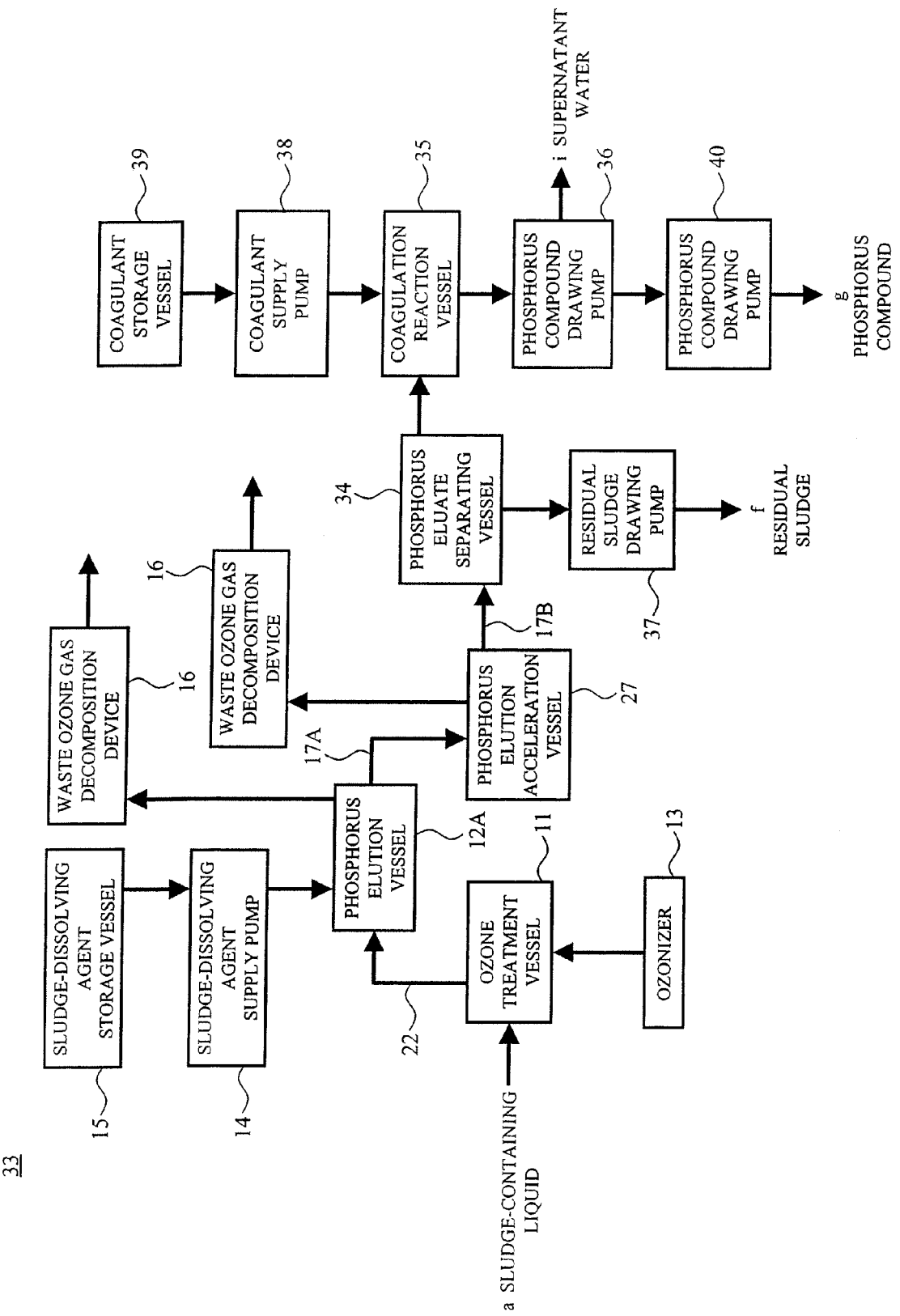
FIG. 17 is a block diagram showing a construction of a sludge treatment apparatus according to Embodiment 6 of the present invention.

FIG. 17 is a diagram illustrating a sludge treatment apparatus 33 according to Embodiment 6 of the present invention.

In FIG. 17, the sludge treatment apparatus 33 is provided with an ozone treatment vessel 11, a phosphorus elution vessel 12A, a phosphorus elution acceleration vessel 27, a phosphorus eluate separating vessel 34, a coagulation reaction vessel 35, and a phosphorus compound separating vessel 36. The phosphorus elution vessel 12A is connected downstream of the ozone treatment vessel 11, and the phosphorus eluate separating vessel 34 is connected downstream of the phosphorus elution acceleration vessel 27. The coagulation reaction vessel 35 is connected downstream of the phosphorus eluate separating vessel 34, and the phosphorus compound separating vessel 36 is connected downstream of the coagulation reaction vessel 35. A residual sludge drawing pump 37 is connected to a bottom portion of the phosphorus eluate separating vessel 34, and a coagulant storage vessel 39 which temporarily stores a coagulant is connected to the coagulation reaction vessel 35 through a coagulant supply pump 38. A phosphorus compound drawing pump 40 is connected to a bottom portion of the phosphorus compound separating vessel 36. The construction up to the phosphorus elution acceleration vessel 27 is the same as the construction shown in FIG. 6, and thus, the same portions as those in FIG. 6 are represented by the same reference, numerals and descriptions thereof are omitted in Embodiment 6 of the present invention.

Sludge treatment using such a sludge treatment apparatus 33 involves: supplying a phosphorus eluted sludge-containing liquid b from the phosphorus elution acceleration vessel 27 to the phosphorus eluate separating vessel 34 through a discharge pipe 17B; and separating the phosphorus eluted sludge-containing liquid b into a phosphorus eluate containing a large amount of phosphorus eluted from the sludge and residual sludge f. Examples of available separation methods include precipitation, centrifugation, floatation, and membrane separation.

The phosphorus eluate separated in the phosphorus eluate separating vessel 34 is supplied to the coagulation reaction vessel 35, while the coagulant is supplied from the coagulant storage vessel 39 to the coagulation reaction vessel 35 through the coagulant supply pump 38. Carbonate groups are removed through previous treatment, and thus, phosphorus in the phosphorus eluate reacts efficiently with the coagulant, resulting in a large amount of a coagulated phosphorous compound g. The phosphorus eluate treated in the coagulation reaction vessel 35 is supplied to the phosphorus compound separating vessel 36 and is separated into the coagulated phosphorus compound g (solid) and supernatant water i. The phosphorus compound g is drawn with the phosphorus compound drawing pump 40 and is recovered. The supernatant water i contains a large amount of organic substances, and can be used for energy recovery such as organic acid fermentation or methane fermentation.

Meanwhile, the residual sludge f separated in the phosphorus eluate separating vessel 34 is drawn with the residual sludge drawing pump 37 and is discharged to the outside of the vessel. The residual sludge f is modified to be easily biodegradable, and is concentrated during separation of the phosphorus eluate and the residual sludge f. Thus, the residual sludge f can be used for energy recovery such as organic acid fermentation or methane fermentation. For example, valuable substances except phosphorus (such as protein, magnesium, and potassium) or energy can be recovered by: supplying the residual sludge f drawn with the residual sludge drawing pump 37 to an adjustment vessel; adjusting pH or the like of the residual sludge f; and supplying the residual sludge f to an anaerobic digestion vessel for acid fermentation or methane fermentation.

The coagulation reaction vessel 35 only needs to be a vessel that allows an efficient coagulation reaction between phosphorus and the coagulant, and is preferably provided with a high speed mixer or a static mixer.

Further, examples of the coagulant include calcium chloride, hydrated lime, quick lime, ferric chloride, aluminum sulfate, polyacrylamide (PAC), a polymer coagulant, zirconium oxide, and magnesium. When an alkaline aqueous solution is particularly used as a sludge-dissolving agent e (pH of sludge of 9 or more), a calcium-based coagulant is used as the coagulant, to thereby precipitate the phosphorus compound g easily. The supply of the calcium-based coagulant in this case is preferably 2 to 10, more preferably 3 to 9 in molar ratio (Ca/P ratio) with respect to phosphorus in the sludge-containing liquid.

According to Embodiment 6, the carbonate groups in the phosphorus eluate are removed, allowing efficient recovery of phosphorus and sludge volume reduction.

Effects similar to those in Embodiment 6 may be obtained by connecting the upstream of the phosphorus eluate separating vessel 34 with the phosphorus elution vessels 12, 12A, 12B, and 12C and the phosphorus elution acceleration vessels 27, 27A, and 27B in other embodiments. That is, the construction upstream of the phosphorus eluate separating vessel 34 may employ any of those in Embodiments 1 to 5 (FIGS. 1, 6, 9, 13, and 14). Of those, when the construction of Embodiment 5 (FIG. 14) is employed, the phosphorus eluted sludge-containing liquid b may be supplied respectively from the phosphorus elution vessel 12C and the phosphorus elution acceleration vessel 27B to the phosphorus eluate separating vessel 34. Alternatively, the phosphorus eluted sludge-containing liquids b from the phosphorus elution vessel 12C and from the phosphorus elution acceleration vessel 27B may be mixed once and then supplied to the phosphorus eluate separating vessel 34. Further, only the sludge-containing liquid b from the phosphorus elution vessel 12C need be supplied to the phosphorus eluate separating vessel 34, and the sludge-containing liquid b from the phosphorus elution acceleration vessel 27B may be supplied to other treatment systems such as a water treatment system and a sludge treatment system. Thus, sludge treatment volume may be reduced.

In Embodiment 6 of the present invention, a coagulation separation method was employed as a phosphorus recovery method, but the phosphorus recovery method is not limited thereto. Phosphorus recovery methods such as crystallization methods, magnesium ammonium phosphate (MAP) methods, and adsorption methods can also be employed.

In the sludge treatment apparatuses of the present invention, the upper portions of the ozone treatment vessels 11 and 11A are hemispherical but are not limited to those as long as the shape allows smooth delivery of the bubbles c with the sludge adsorbed through the bubble discharge port 22. Further, the ozone treatment vessels 11 and 11A may be operated while the volume of bubbles are controlled by automatically controlling the number of revolutions or position of the bubble mixing blade 20, or may be operated without the bubble mixing blade.

In the sludge treatment apparatuses of the present invention, the waste ozone gas decomposition device 16 is provided above both the phosphorus elution vessels 12, 12A, 12B, and 12C and the phosphorus elution acceleration vessels 27, 27A, and 27B, but may be provided above only the phosphorus elution vessels 12, 12A, 12B, and 12C.

In the sludge treatment apparatuses of the present invention, a bottom cover may be provided at the bottom portions of the phosphorus elution vessels 12, 12A, and 12B. The bottom cover may be controlled to open and close by interlocking with an amount of a mixed liquid accumulated at the bottom portions of the phosphorus elution vessels 12, 12A, and 12B or controlled to open and close through timer control. The control of the bottom cover can facilitate operation management of the sludge treatment apparatuses 10, 26, 29, 30, and 33. Further, the phosphorus elution vessels 12, 12A, 12B, and 12C may rotate to eliminate bubbles through centrifugal force. Thus, the bubbles are eliminated in a short period of time, thereby accelerating reaction between the sludge and the sludge-dissolving agent e.

What is claimed is:

1. A sludge treatment method, comprising the steps of:
   foaming a sludge-containing liquid by blowing an ozone-containing gas into the sludge-containing liquid to generate sludge-adsorbed bubbles and discharge the bubbles from a bubble discharge port provided in an upper portion of an ozone treatment vessel, wherein the ozone-containing gas is blown into the sludge-containing liquid during the foaming step using a diffuser pipe provided at the bottom of the ozone treatment vessel, and wherein the foaming step further includes mixing the sludge-containing liquid and the bubbles using a bubble mixing blade provided at an upper portion of the ozone treatment vessel and a liquid mixing blade provided at a lower portion of the ozone treatment vessel;
   eluting phosphorus in the sludge-containing liquid by supplying the bubbles to a phosphorous elution vessel from the bubble discharge port thereby bringing sludge adsorbed on the bubbles and a sludge-dissolving agent into contact with each other within the phosphorous elution vessel; and
   decomposing waste ozone gas not dissolved in the sludge-containing liquid into oxygen, wherein the waste ozone gas is received from an upper portion of the phosphorous elution vessel.

2. A sludge treatment method according to claim 1, further comprising the step of:
   precipitating a phosphorus compound by separating the phosphorus eluted sludge-containing liquid into a phosphorus eluate and a residual sludge and by adding a coagulant to the separated phosphorus eluate.

3. A sludge treatment method according to claim 1, further comprising the step of:
   discharging the oxygen into the atmosphere.

4. A sludge treatment method according to claim 1, further comprising the step of:
   accelerating phosphorus elution by mixing the phosphorous eluted sludge-containing liquid.

5. A sludge treatment method according to claim 4, further comprising the step of:
   circulating sludge between the phosphorous elution vessel and a phosphorous elution acceleration vessel within which the accelerating step is performed.

6. A sludge treatment method according to claim 4, further comprising the step of:
   precipitating a phosphorus compound by separating the phosphorus eluted sludge-containing liquid into a phosphorus eluate and a residual sludge and by adding a coagulant to the separated phosphorus eluate.

7. A sludge treatment method according to claim 1, further comprising the steps of:
   receiving residual liquid from the foaming step that was not adsorbed on the bubbles; and
   accelerating phosphorus elution by mixing the phosphorous eluted sludge-containing liquid and the residual liquid.

8. A sludge treatment method according to claim 7, further comprising the step of:
   circulating sludge between the phosphorous elution vessel and a phosphorous elution acceleration vessel within which the accelerating step is performed.

9. A sludge treatment method according to claim 7, further comprising the step of:
   precipitating a phosphorus compound by separating the phosphorus eluted sludge-containing liquid into a phosphorus eluate and a residual sludge and by adding a coagulant to the separated phosphorus eluate.

10. A sludge treatment method according to claim 1, further comprising the steps of:
    receiving residual liquid from the foaming step that was not adsorbed on the bubbles; and
    accelerating phosphorus elution by bringing the residual liquid and a sludge-dissolving agent into contact with each other.

11. A sludge treatment method according to claim 10, further comprising the step of:
    circulating sludge between the phosphorous elution vessel and a phosphorous elution acceleration vessel within which the accelerating step is performed.

12. A sludge treatment method according to claim 1, wherein the eluting phosphorous step further includes mixing phosphorus eluted sludge-containing liquid within the phosphorous elution vessel.

13. A sludge treatment method according to claim 12, wherein the mixing is performed using at least one liquid mixing blade provided at a lower portion of the phosphorous elution vessel and at least one defoaming blade provided above the at least one liquid mixing blade.

14. A sludge treatment method according to claim 13, wherein a greater number of defoaming blades are provided in the phosphorous elution vessel than liquid mixing blades.

* * * * *